United States Patent
Demsey et al.

(10) Patent No.: US 10,614,213 B1
(45) Date of Patent: Apr. 7, 2020

(54) DETECTING MALICIOUS CODE EXISTING IN INTERNET ADVERTISEMENTS BY ONGOING SANDBOX MONITORING

(71) Applicant: CLEAN.IO, INC., McLean, VA (US)

(72) Inventors: Seth Demsey, New York, NY (US); Alexey Stoletny, New York, NY (US); Iván Soroka, New York, NY (US)

(73) Assignee: CLEAN.IO, INC., McLean, VA (US)

( * ) Notice: Subject to any disclaimer, the term of this patent is extended or adjusted under 35 U.S.C. 154(b) by 0 days.

(21) Appl. No.: 16/687,184

(22) Filed: Nov. 18, 2019

(51) Int. Cl.
| | |
|---|---|
| *G06F 21/53* | (2013.01) |
| *G06F 21/56* | (2013.01) |
| *G06F 21/55* | (2013.01) |
| *G06Q 30/02* | (2012.01) |

(52) U.S. Cl.
CPC ............ *G06F 21/53* (2013.01); *G06F 21/552* (2013.01); *G06F 21/564* (2013.01); *G06F 21/566* (2013.01); *G06Q 30/0277* (2013.01); *G06F 2221/2119* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,516,590 | B1 * | 8/2013 | Ranadive | ............ H04L 63/1433 713/187 |
| 2004/0199603 | A1 * | 10/2004 | Tafla | ..................... G06F 16/957 709/217 |
| 2005/0060535 | A1 * | 3/2005 | Bartas | ..................... H04L 63/02 713/154 |
| 2005/0264581 | A1 * | 12/2005 | Patrick | ................ H04L 65/4076 345/594 |
| 2009/0094175 | A1 * | 4/2009 | Provos | ................... G06F 21/564 706/12 |
| 2013/0160120 | A1 * | 6/2013 | Malaviya | ................. G06F 21/53 726/23 |
| 2014/0351889 | A1 * | 11/2014 | Liu | .......................... H04L 63/10 726/3 |
| 2015/0096031 | A1 * | 4/2015 | Benoit | .................... G06F 21/53 726/24 |
| 2018/0012256 | A1 * | 1/2018 | Napchi | .............. G06Q 30/0277 |
| 2018/0129804 | A1 * | 5/2018 | Chen | ....................... G06F 21/53 |

\* cited by examiner

*Primary Examiner* — Malcolm Cribbs
(74) *Attorney, Agent, or Firm* — SoCal IP Law Group LLP; Steven C. Sereboff; Angelo Gaz

(57) ABSTRACT

There are disclosed devices, system and methods for detecting malicious code existing in an internet advertisement (ad) requested by a published webpage viewed by a user. First, receipt of malicious code of the ad is detected, where that code may be malicious code that causes a browser unwanted action without user action. If the internet ad is an SCR type document, the malicious code may be wrapped in a java script (JS) closure to detect an unwanted action requested by the malicious code. The malicious code is executed a browser sandbox that activates the unwanted action, that displays execution of the internet ad and that allows execution of the unwanted action. When a security error resulting from the unwanted action is detected, executing the malicious code in the browser sandbox is discontinued, displaying of the internet ad on the display is discontinued, and execution of the unwanted action is stopped.

22 Claims, 6 Drawing Sheets

DETECTING MALICIOUS CODE EXISTING IN INTERNET ADVERTISEMENTS BY ONGOING SANDBOX MONITORING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to detecting malicious code existing in internet advertisements by ongoing sandbox monitoring.

Description of the Related Art

An Internet advertisement ("ad") is typically displayed in a certain area or space of a publisher's Internet webpage, such as a webpage of content for readers to see. The publisher may provide a certain ad space or call in their webpage content for a browser to download an internet ad from an advertiser or server. For example, a publisher may designate a slot (e.g., space, location or placement on their published webpage) and know how and when the ad unit runs. Typically, the ads have pixels that are typically images that load from somewhere (e.g., a party such as an advertiser or intermediary) and thereby signal that party they loaded from about a certain action (like an impression). Then, the loaded ads will typically have a link to click on to go to another webpage. In some cases, the link is a combination of the hyper-text markup language (HTML) tag for a link with the HTML tag for an image or video so that when users click on the link or ad, they are redirected from the publisher's webpage to the advertiser's website to make a purchase. The click on the advertisement activates a browser call to download a page from the associated advertiser's website that the browser can render (e.g. display) on the computing device.

However, the downloaded ads access to the computing device may not be secure because the ad may not be sufficiently vetted or reviewed to ensure it does not include malware (e.g., malicious code). This can be a problem, at least for the users because the ads themselves are a piece of HTML+JavaScript+cascading style sheets (CSS), which runs in the trusted scope of the user browsing session (often times having access to a first party domain which the user is viewing the ad from). This means that many ads, coming from anywhere, actually have full access to what a user does, types or sees on the site because they have access to the first party domain, and malware in those ads can do a lot of damage, with redirects being one of the types of this kind of damage. Some ads will not have full access because they do not have access to the first party domain. Similar to an executable file from an untrusted party running on a user's computer (trusted environment), same thing happens with ads where this trust boundary is implicitly violated. Users do not realize that the ads on a website may have access to their shopping cart or details they enter on the site. Site owners do not want to let the ads do anything their site can accomplish, and they want to limit what the ad can do to only certain types of activities (e.g. define a policy). However, there is little control of that in the browser, and while some things can be set using browser sandbox attributes, cryptographic service provider (CSP), etc., this does not stop sophisticated malicious actors or malware.

And, increasingly, advertising networks or intermediaries have become targets of malware that, effectively, has open access to internet users. Consequently, there is a problem when an ad incorporates malicious code that may perform unwanted actions (such as non-user-initiated redirects), or forcing redirects to legitimate sites (e.g., so that the advertiser effectively gets a "100% click-through rate" and can make money on this). When this malware is rendered by the browser it exposes the user's computer to harmful unwanted actions such as unwanted data access, cryptocurrency mining, "trick" webpages that attempt to force users to do unwanted actions, or to the automatic or near-automatic downloading of unwanted applications, harmful content such as viruses, or unpaid for advertising images.

Thus, there is a need to detect this malware and/or unwanted actions on the publisher's webpage to give website owners greater control over third party Java Script code executed on their sites, which otherwise was not available.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Technologies described herein include systems and methods for detecting malicious code within or existing in internet advertisements ("ads") by ongoing sandbox monitoring. The system may include a user computing device that receives a publisher's webpage having ad space or a call for an internet ad which includes malicious code (e.g. an ad with malware). The webpage may be a published webpage being displayed to a user that is protected by having protection computer instructions or code that detects, intercepts execution of, stops execution of and/or refuses to load malicious code existing in an internet ad promoting goods and/or services requested from a third party advertiser by the user's browser. In this document, the term "detect" (e.g., and/or detecting, detected etc.) may be used to describe monitoring for, detecting, intercepting execution of, stopping execution of, preventing execution of, modifying and/or refusing to load malicious code existing in an internet ads.

Figure 1A:
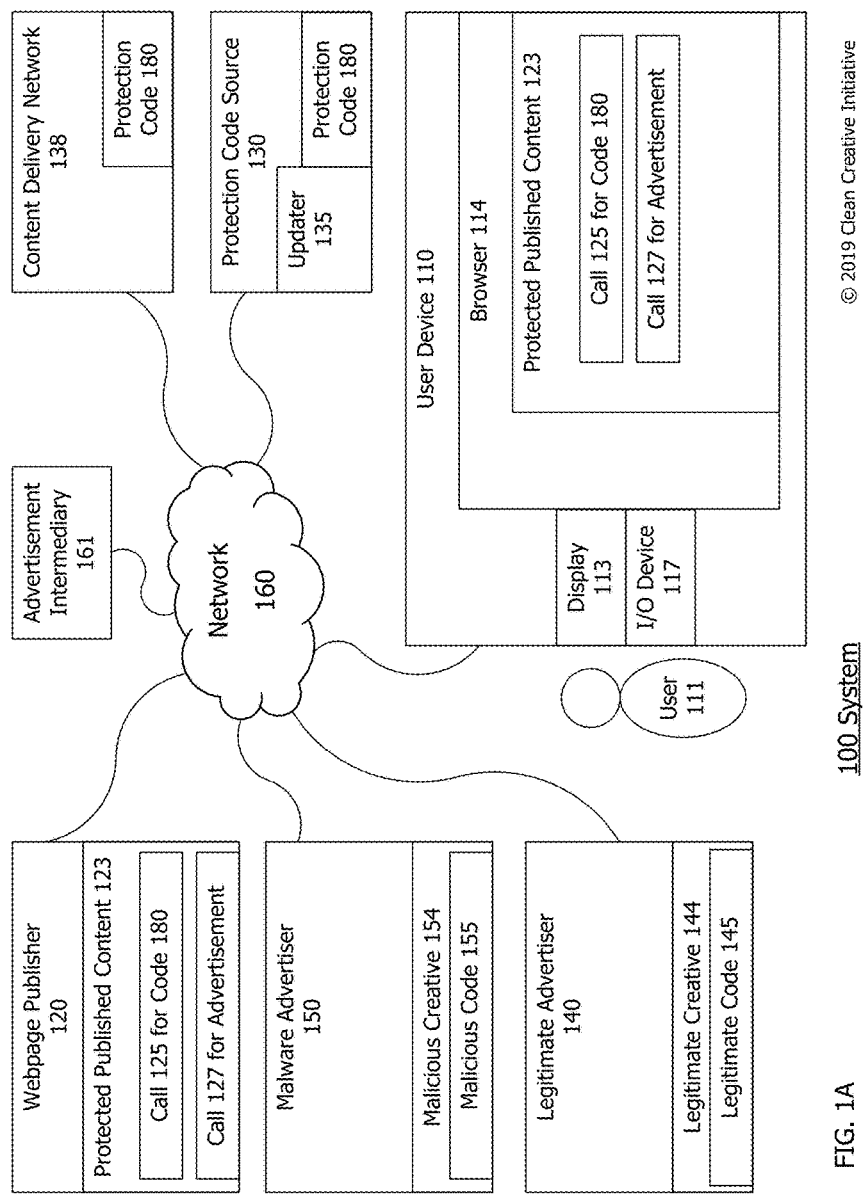
FIG. 1A is a system for detecting malicious code existing in internet advertisements by ongoing sandbox monitoring.
Figure 1B:
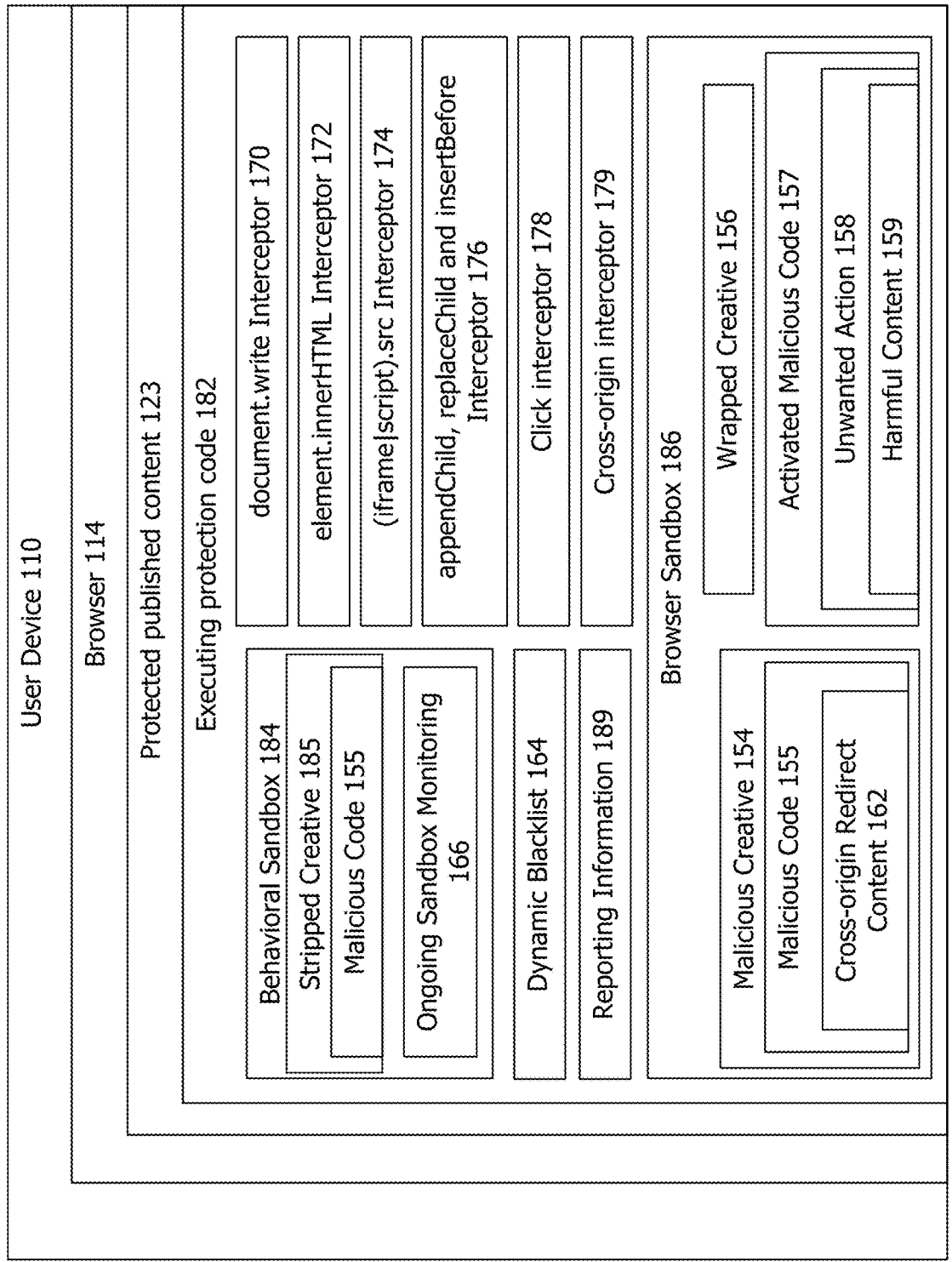
FIG. 1B is a user device executing a protected published webpage content that has the ability to detect malicious code existing in internet advertisements by ongoing sandbox monitoring.

As noted herein and quickly referring to FIGS. 1A-B, for a typical or legitimate internet advertisement such as legitimate creative 144, legitimate code 145 may be activated by a user's click (e.g., click with a mouse, keyboard key or touchscreen tap) to cause an instruction or command to be provided to a web browser, sandbox or similar web-based software, that instructs that software open a destination landing page. This opening may access or request access to content (e.g., computer code to be rendered or downloaded) from a web location different from the one currently being viewed or accessed by that software. When activated, a legitimate code 145 may be or cause a browser legitimate action such as an intentional redirect, opening of a new window, opening of a browser tab, opening of an AppStore or opening of another application. In this legitimate case, the activated legitimate code 145 may be the hypertext markup language link that activates in response to user interaction with an advertisement so as to direct a web browser to legitimate code. In this legitimate case, the downloaded content (e.g., code) can be the content to which an advertisement redirects a browser when a user clicks or otherwise interacts with that advertisement within a web page.

However, for malicious creatives (e.g., illegitimate or malware ads), malicious code 155 (e.g., malware) may be automatically (e.g., without being activated by a user's click) cause an instruction or command to be provided to a web browser, sandbox or similar web-based software, that instructs that software open a destination landing page. This opening may be or include an instruction or command that automatically activates (e.g., without user 111 interaction, activation or action) as activated malicious code 157 that when provided to a web browser 114 or similar web-based software, instructs that software to perform an unwanted action 158, such as to request access to harmful content 159 at a web location different from the webpage currently being viewed or accessed by that browser. That is, malicious code 155 may automatically activate as activated malicious code 157 during or after the advertisement executed or rendered, which may be or cause a browser unwanted action 158 for harmful content 159. The browser unwanted action may be an unwanted redirect, unwanted opening of a new window, unwanted opening of a browser tab, unwanted opening of an AppStore and/or unwanted opening of another application. Activated malicious code 157, may be automatically activated from code 155 without user interaction with an internet advertisement or malicious creative 154 or 185; and direct a web browser 114 to perform (e.g., execute, make and/or take) an unwanted action 158 (e.g., to request, render or download harmful content 159). In some cases, malicious code 157, is a trigger such as a hypertext markup language link, or other thing that causes the unwanted action in the browser, automatically without user interaction. Activated malicious code 157, may be or cause an unwanted action 158. Harmful content 159, may be the content to which an advertisement unwanted action causes a browser 114 (e.g., automatically, activated code 157 takes action 158) without a user click or otherwise interacting with the creative 154 or 185 within a web page content 123.

Description of Apparatus

Referring now to FIG. 1A, there is shown a system 100 for detecting malicious code existing in internet advertisements ("ads") or creatives, such as by ongoing sandbox monitoring. The system 100 includes the following system components: the user device 110, the webpage publisher 120, the protection code (e.g. computer instructions or software) source 130, the legitimate advertiser 140, the malware (e.g., ad with malicious code 155) advertiser 150, the network 160 and the content delivery network (CDN) 138 having protection code 180. Each of the components is or includes at least one computing device such as computing device 500 of FIG. 5. Each of these computing devices is connected to the network 160 through a data connection as shown by the lines between each computing device and the network 160. Each system component's computing device may communicate with and transfer data to any of the other system component's computing device through the network 160 and the data connections between those components. The system 100 may include additional components. For example, there may be numerous user devices 110, publisher 120 and advertiser 150 connected to the network 160.

The device 110 may automatically detect malicious code existing in internet advertisements ("ads") or creatives. For example, when the user 111 requests the content 123 or code 155, the device 110 may automatically detect the malicious code, such as by ongoing sandbox monitoring without further input or activation by the user. The device 110 may be used by user 111 to download, execute or render published content 123 and call 127 for malicious creative 154. It may automatically perform call 125 for protection code 180 during rendering of content 123. In some cases, call 125 exists in the header of the page having content 123. The user device 110 may be any of computing devices 500 (see FIG. 5) such as a personal computer or client computer located at a business, residence for accessing the Internet.

The user device 110 has display 113; and input/output (I/O) device 117 for data outputting to and data inputting from user 111. The user may be a person using device 110, such as to surf the Internet by using display 113 and device 117 to access browser 114. The device 110 has browser 114 for rendering protected published content 123, executing call 125 for protection code 180 and call 127 for malicious creative 154. Browser 114 may be any of various browsers such as Chrome®, Internet Explorer®, Edge®, Firefox®, Safari® or Opera®.

The webpage publisher 120 may be a source of published webpages that are or include protected published content 123 having call 125 for protection code 180 and call 127 for internet creatives 144 or 154. The calls 125 and 127 or other calls herein may be HTTP, HTML IP or other calls know for browser 114 and/or network 160.

The protection code source 130 may be a developer of the protection code 180 such as a generator, administrator or author of computer instructions or software that is code 180. It has updater 135 for updating code 180 based on reporting information 189.

The legitimate advertiser 140 may be an advertiser providing internet advertisements or legitimate creatives 144 for goods and/or services having a legitimate code 145. The legitimate code 145 may be for legitimate redirecting or action by browser 114 to a website of the advertiser 140 or another legitimate advertiser when user 111 clicks on legitimate creative 144 or legitimate code 145. Activation (e.g., execution or rendering) of code 145 may cause an intended action by the browser 114 after or due to user 111 clicking on an area or location of legitimate creative 144 or code 145. In some cases, an intended action is an action that is intended by the user, desired by the user and/or caused by a user action. In some cases, an intended action is an action taken by a browser or sandbox after and/or due to user 111 clicking on an area or location of a creative or its code (e.g., an action caused when code 145 is activated by a browser or sandbox as noted herein). An intended action may be a pop-up, redirect, playing of video, video stuffing, playing of audio, interstitial, etc. cause by activation of code 145 and an intentional user action such as a click using a mouse pointer or keyboard entry. The malware advertiser 150 may be an illegitimate or malware advertiser that creates malicious creative 154 with or as malicious code 155. In some cases, advertiser 150 adds to or replaces code of internet advertisements for goods and/or services such as legitimate creative 144 with illegitimate or malicious creative 154 or code 155 such as to cause unwanted action by browser 114 to a website other than the intended website (e.g., other than to the advertiser 140 or another legitimate advertiser). The malware advertiser 150 may have a malicious code replacer or adder to put code 155 into legitimate creative 144, thus writing over existing code or adding to code of legitimate code 145 to create malicious creative 154. In other cases, a malware advertiser 150 may simply be an advertiser creates malware as or within the malicious creative 154. Activation (e.g., execution or rendering) of code 155 may cause unwanted action by the browser 114 prior to or without user 111 clicking on any area or location of malicious creative 154 or code 155. In some cases, an unwanted action is an action that is not intended by the user, not desired by the user and/or not caused by a user action. In some cases, an unwanted action is an action taken by a browser or sandbox prior to and/or without user 111 clicking on any area or location of a creative or its code (e.g., an action caused when code 155 is activated by a browser or sandbox as noted herein). An unwanted action may be an automatic or forced pop-up, redirect, playing of video, video stuffing, playing of audio, interstitial, etc. cause by activation of code 155 and without an intentional user action such as without a click using a mouse pointer or without a keyboard entry.

The advertisement intermediary 161 may be an intermediary located between webpage publisher 120 and advertisers 140 and/or 150; such as for providing (e.g., serving) advertisements such as creatives 144 and/or 154 to the publisher 120. The advertisement intermediary 161 may be a supply side platforms (SSP) or a demand side platform (DSP) that signs up advertisers 140 and/or 150 and provides the creatives 144 or 154 such as in response to the call 127 by the publisher 120. The advertisement intermediary 161 may unknowingly provide malicious creative 154 to the publisher 120. The intermediary 161 may represent multiple intermediaries between the advertisers 140 and/or 150 and publisher 120.

The content delivery network (CDN) 138 may be a source of protection code 180 such as provided by protection code source 130. It may receive updated versions of the code 180 from updater 135.

The content 123, the creative 144, the code 145, the creative 154, the code 155 and/or the code 180 may be computer instructions in one or more software language such as but not restricted to JavaScript (JS), hyper-text markup language (HTML), Cascading style sheets (CSS), and the like. A creative may consist of the initial payload, which will then call, include, or otherwise reference additional source files downloaded from external sources (such as additional JS, HTML, CSS, image or other files as defined above), each of which may further reference additional files. The additional files may be used to track visits, serve additional user interface elements, enable animation or cause legitimate or illegitimate redirects to other sites or locations, or other activity.

Figure 5:
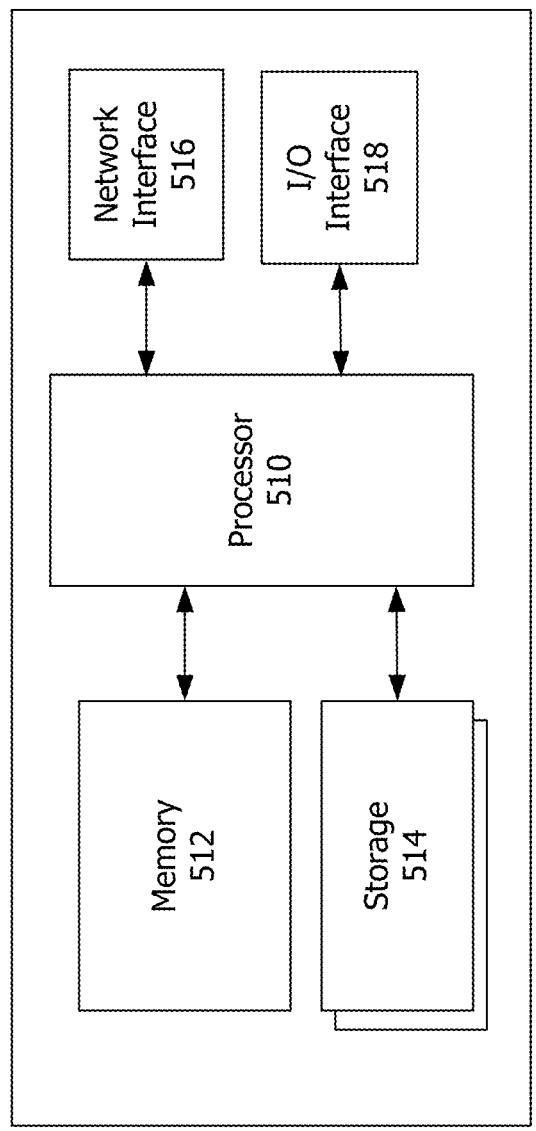
FIG. 5 is a block diagram of a computing device.

The network 160 may be a network that can be used to communicate as noted for the network attached to computing device 500 of FIG. 5, such as the internet. Each of the components of system 110 may have a network interface for communication through a data connection with the network 160 and with other components of the system 100. Each data connection may be or include network: connections, communication channels, routers, switches, nodes, hardware, software, wired connections, wireless connections and/or the like. Each data connection may be capable of being used to communicate information and data as described herein.

Referring now to FIG. 1B, there is shown the user device 110 having browser 114 executing a protected published webpage content 123 that has the ability to detect malicious code existing in internet advertisements, such as by ongoing sandbox monitoring. The FIG. 1B may show user device 110 at a point in time after the webpage 123 is rendered; and protection code 180 has been downloaded and is executing as executing protection code 182. At this time call 127 has been executed; and malicious creative 154 having malicious code 155 has been downloaded or received.

FIG. 1B shows code 182 having or executing behavioral sandbox 184 which is executing a wrapped creative 185 which may be a Java script (JS) wrapped version of malicious creative 154 with code 155 in browser 114. Other than a JS wrapped version, other appropriately wrapped versions of malicious creative 154 are also considered. The sandbox 184 may be used by the code 182 to detect and/or intercept malicious code 155, such as immediate and/or deferred types of unwanted action requested by the malicious code 155. The behavioral sandbox 184 may take many forms, but it is defined by its capability to execute software code in an environment in which that code may not perform any important system-level functions or have any effect upon an ongoing browser session. In a preferred form, the behavioral sandbox 184 may operate in a protected portion of memory that is denied access to any other portions of memory.

FIG. 1B also shows code 182 having or executing browser sandbox 186 which may be a protected part, subpart (e.g. a plugin or extension) or version of a browser 114 executing malicious creative 154 with code 155. The sandbox 186 may be used by the code 182 to detect and/or intercept malicious code 155, such as deferred types of unwanted action requested by the malicious code 155, such as by ongoing sandbox monitoring. The code 155 may have cross-origin malicious code 162 such as for causing cross-origin type unwanted actions and errors of code 155.

In some cases, browser sandbox 186 is also executing the wrapped creative 185 which may be a Java script (JS) wrapped version of malicious creative 154 with code 155 in browser 114. In some cases, if the internet ad is an SRC type document, the malicious code is wrapped in a java script (JS) closure to detect an unwanted action requested by the malicious code. This may be code 182 detecting receipt by the browser 114 of, and due to that detecting, wrapping creative 154 in a JS closure. Other than a JS wrapped version, other appropriately wrapped versions of malicious creative 154 are also considered. The wrapped version executed by sandbox 186 may be an (iframe/script).src (e.g., see at 316) and/or an iframe.src doc if creative 154 or code 155 includes a JS protocol (e.g., see at 332).

The code 182 also has blacklist 164 for preventing cross-origin type unwanted actions of content 162. The code 182 has ongoing sandbox monitoring 166 which may be part of code 182 that performs continued monitoring of execution of ad 164 in sandbox 184 and/or of malicious creative 154 rendering in sandbox 186 to detect code 155 or unwanted actions of code 155.

The code 182 also has activated malicious code 157 which may be malicious code 155 activated by sandbox 186, such as for ongoing sandbox monitoring. The activated code 157 may cause a browser unwanted action 158 which can cause harmful content 159, such as the download of harmful content.

The code 182 has document.write interceptor 170, such as for detecting document.write type writes, unwanted actions and errors caused by code 155. The interceptor 170 may detect and/or intercept document.write types of unwanted actions of or requested by the code 155.

Next, the code 182 has element.innerHTML interceptor 172, such as for detecting element.innerHTML type writes, unwanted actions and errors caused by code 155. The interceptor 172 may detect and/or intercept element.innerHTML types of unwanted actions of or requested by the code 155.

In addition, the code 182 has (iframe|script).src interceptor 174, such as for detecting (iframe|script).src type writes, unwanted actions and errors caused by code 155. The interceptor 174 may detect and/or intercept (iframe|script) .src types of unwanted actions of or requested by the code 155.

The code 182 has appendChild, replaceChild and insertBefore interceptor 176, such as for detecting appendChild, replaceChild and insertBefore type writes, unwanted actions and errors caused by code 155. The interceptor 176 may detect and/or intercept appendChild, replaceChild and insertBefore types of unwanted actions of or requested by the code 155.

The code 182 has click interceptor 178 such as for detecting programmatically generated clicks, unwanted actions and error caused by code 155. The interceptor 178 may detect and/or intercept programmatically generated click types of unwanted actions of or requested by the code 155.

The code 182 has cross-origin interceptor 179, such as for detecting cross-origin source type writes, unwanted actions and errors caused by code 155. The interceptor 179 may detect and/or intercept cross-origin source types of unwanted actions of or requested by the code 155.

Finally, the code 182 has reporting information 189 such as information to report the detections of the code 155 by code 182, such as by reporting code 155, the unwanted actions requested by code 155, and the types of unwanted action requested by the malicious code 155.

Each of browser 114, published content 123, call 125, call 127, protection code 180, executing code 182 and/or any of items 154-178 shown within code 182 may each be computer data and/or at least one computer file.

Intercepting malicious code (e.g., code 155) by code 182 (e.g., such as for ongoing sandbox monitoring) may include code 182 monitoring for, detecting, stopping execution of, preventing execution of, preventing activation of, discontinuing rendering of, blocking calls from, stopping calls of, stopping any downloads caused by, modifying code 155, and/or refusing to load the malicious code. In some cases, intercepting malicious code includes stopping execution of, preventing execution of, preventing activation of, discontinuing rendering of, blocking calls or, stopping calls of and/or stopping loading the malicious code. Intercepting malicious code may be code 182 stopping or blocking browser 114 from taking any of the above noted intercepting actions.

In general, the code 182 is designed and operates in such a way that it automatically intercepts or detects actions that are more likely to be used for nefarious purposes or that can otherwise operate negatively or beyond the scope of what is typically necessary for an advertisement. In some cases, code 182 is Java script code that focuses on malicious ads such as creative 154 and stops unwanted actions (such as redirects, pop-ups, video stuffing, etc.) by malicious code 155 (e.g., calls, scripts, payload and the like) from happening by offering a more granular control over what JavaScript/ES (JavaScript/ECMAScript, a standard governing Javascript—a scripting-language specification standardized by Ecma International in ECMA-262 and ISO/IEC 16262), HTML, cascading style sheets (CSS) (whether executed as a part of an ad or otherwise delivered to the webpage in some way) can do on a page. Code 182 may use numerous methods, such as native browser sandboxing, overriding numerous native JavaScript calls (such as document.write, document.appendChild, etc.) used to manipulate DOM (document object model) of a page rendered in the browser 114 from JavaScript.

In some cases, the code 182 focuses on working with any Java Script code that gets to a webpage (e.g., the content 123) and intends to execute (whether from ads or not). In this case, the code 182 will not discern "malicious code" from other content or detect it, but rather implement a policy to stop the redirects or actions from happening when called without user action. For example, an advertiser (e.g., advertiser 140 or 150) may deliver an ad to the page that has numerous "pixels" or JS code that will fire events back to the advertiser to notify them of an impression count, when it occurred (regardless if an ad is malicious or not). The malicious actors or advertiser 150, however, will typically include additional pixels or calls to notify and track their own servers about how the malicious code is executed on the user devices and collect additional data. Specifically, before any ad call is executed, code 182 may initialize various interceptors and override various JS methods to monitor (e.g., "watch") creatives and their code as it gets delivered to the webpage. The creatives can get delivered using many different ways and contexts (an inline script being "written" to the page using document.write, a script loaded from a 3rd party URL, as a part of a cross-origin frame, etc.), and each of these may contain one or many of different nested scripts and/or "triggers" that cause malicious activity or unwanted actions, such as redirects.

Description of Processes

Figure 2:
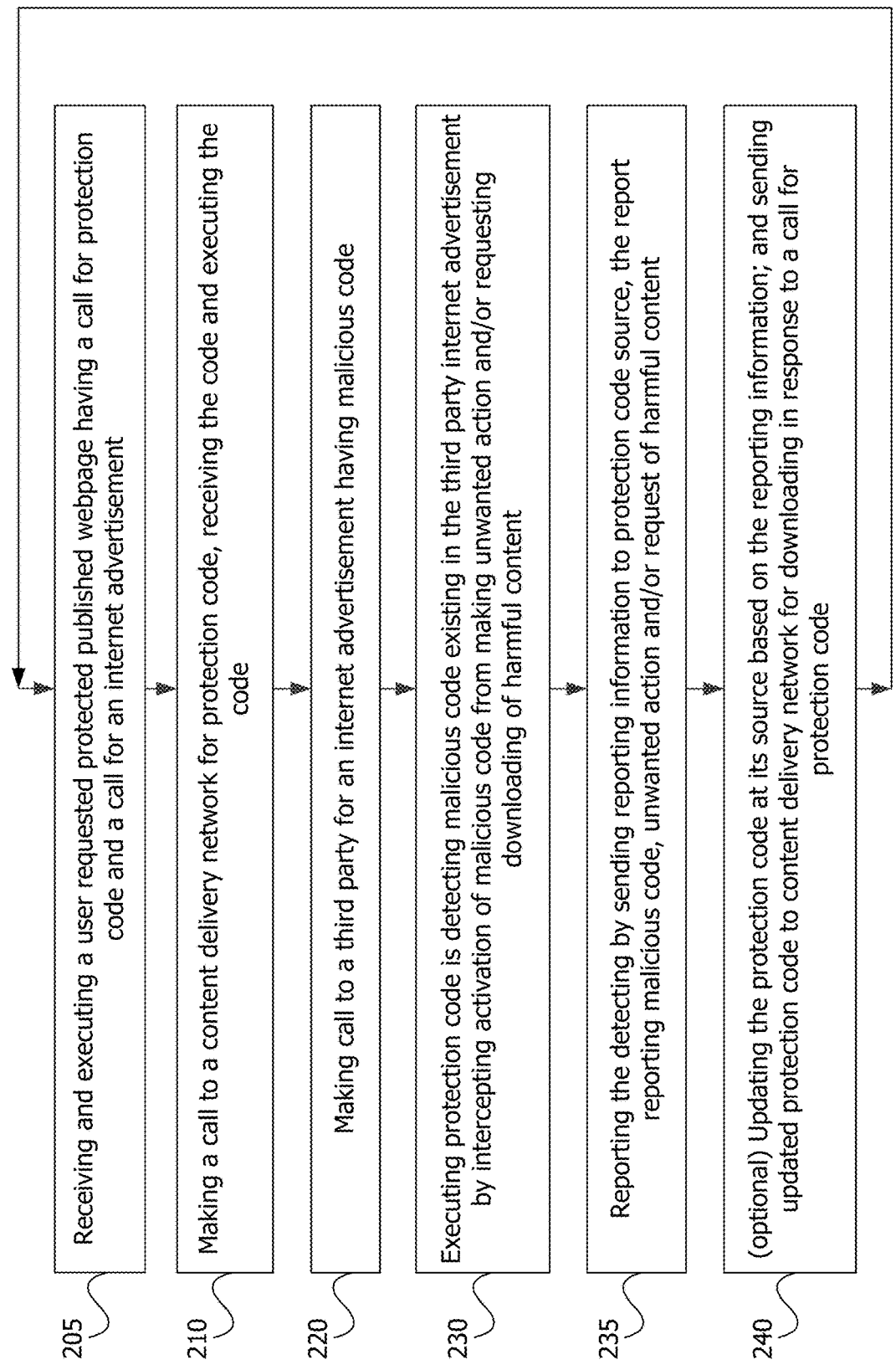
FIG. 2 is an operating environment/process for managing the detecting of malicious code existing in internet advertisements by ongoing sandbox monitoring.

Using the system 100 is possible to manage detection of malicious code 155. The management may include communicating between components of the system 100. For example, referring now to FIG. 2 is a process 200 for managing the detecting of malicious code 155 existing in creatives or internet advertisements by ongoing sandbox monitoring. The process 200 may be or describe an operating environment in which the system 100 can perform the managing. The process 200 may be performed by the system 100, such as shown in FIGS. 1A-B. The process 200 starts at 205 and can end at 240, but the process can also be cyclical and return to 205 after 240. For example, the process may return to 205 when a publisher's webpage is requested by a user of any of various user devices 110 connected to network 160.

The process 200 starts at 205 where a user requested protected publisher webpage is received and executed, such as by the device 110 or the browser 114. The webpage may be or include content 123 having the call 125 to CDN 138 for protection code 180. Content 123 also has call 127 for an internet advertisement or creative. In some cases, call 127 is a call for the creative 144 or 154. It may be a call for the malicious creative 154; an ad for goods and/or services having malicious code 155 existing in the malicious creative 154. Call 127 may be to a third party advertisement source such as to malware advertiser 150 or intermediary 161. Call 125 may exist in a header of the webpage or content 123 and thus be executed before execution of other content of the webpage such as before call 127 that is not in the header.

Executing the content 123 may include rendering some of the webpage content by the browser 114 and/or displaying that content on the display 113. Rendering a webpage, ad or malicious code (e.g., computer data, message, packet or a file) may include a browser or computing device requesting (e.g., making a call over a network to a source for), receiving (e.g., over a network from the source, or downloading), executing and displaying that webpage, ad or malicious code.

Next, at 210 the call 125 for protection code 180 is executed or sent; and the protection code 180 is received or downloaded. Calling and receiving at 210 may include device 110 or browser 114 making the call 125 to content delivery network (CDN) 138 (a source of code 180) or another source of code 180. In some cases, call 125 is to source 130 for protection code 180. Calling and receiving at 210 may include calling for protection code 180, receiving code 180 and executing code 180 as executed code 182.

Then, at 220 the call 127 is made or sent to a third party internet advertiser for an internet advertisement having malicious code 155. Making the call at 220 may be making call 127 for malicious creative 154 having malicious code 155 (malware) existing in it. Making the call at 220 may include executing the call 127 for; and receiving or downloading the internet malicious creative 154 from advertiser 150 or the intermediary 161.

The webpage publisher 120 may provide a certain placement, space or call in their webpage content 123 at which the user's computing device browser 114 downloads the internet malicious creative 154 from an advertiser or server 150. The malicious creative 154 may be requested by the call and negotiated for by advertiser 150 or another source of ads (e.g., intermediary 161 or another source) connected to network 160 which then selects advertiser 150 for providing the ad or malicious creative 154. At this point the other source of ads (e.g., other than advertiser 150), user 111, device 110 and browser 114 may not know that the malicious creative 154 has malicious code 155 (e.g., is a malware ad).

Now, at 230 the malicious code 155 existing in a third party internet malicious creative 154 is detected by the executing protection code 182 executed at 210, such as, detecting by ongoing sandbox monitoring. Detecting at 230 may include code 182 intercepting and monitoring execution or rendering of malicious creative 154 and/or code 155. Detecting at 230 may include code 182 detecting and intercepting execution or activation of code 155. For example, the malicious creative 154 may have some legitimate code or content such as a legitimate image or video promoting goods and/or services that is not code 155; and also has the malicious code 155 which is not legitimate but will cause a malware type of unwanted action during or after loading of malicious creative 154 without user action or input using device 117 or 110. In other cases, malicious creative 154 is the code 155 such as when rendering malicious creative 154 is the same as rendering malicious code 155. Thus, code 182 can monitor and intercept execution of malicious creative 154 when detecting execution of code 155.

The detecting at 230 may protect content 123 from executing or displaying to the user 111, the malicious code 155 and/or harmful content 159 downloaded in response to the activation of the malicious code 155. In some cases, detecting at 230 includes intercepting activation of malicious code 155 from making unwanted action 158, such as a request or redirect for downloading of harmful content 159 in response to the activation of the malicious code 155. Activating a webpage, ad or malicious code may include a browser or computing device executing, rendering or displaying that webpage, ad or malicious code.

For example, the publisher's protected webpage or content 123 has the call 125 to the CDN 138 to download and execute code 180 as code 182. Code 182 is not considered "rendered" or displayed because it has no visual part on the browser 114 or display 113. It may be presumed that content 123 has at least one ad space or call that is to download and executed/rendered malicious creative 154. The malicious creative 154 has already been or will be identified, and the ad comes from a third party advertiser or server that is not webpage publisher 120 or webpage user 111.

In some cases, executing code 182 will monitor all content of the publisher's page of content 123 without any specific check to see if it has an advertisement, because code 182 knows content 123 has at least one call 125 for an ad since source 130 of code 180 has been engaged by the publisher 120 to protect their ad space for ads on their webpage of content 123. In these cases, code 182 will detect any of the malware and/or actions noted herein (e.g., see FIGS. 3-4 and such as noted for code 155), anywhere on the webpage or on published content 123, even if they are not from the malicious creative 154. Here, detecting at 230 may include code 182 monitoring all of content 123 for all legitimate and unwanted actions of the webpage or calls of the webpage.

In other cases, code 182 may separately detect whether there is a call 125 instead of presuming that call 125 exists. After detecting at least one call 125, the code 182 will perform detection of code 155 only for ads such as malicious creative 154 instead of for all of the content 123.

Figure 3:
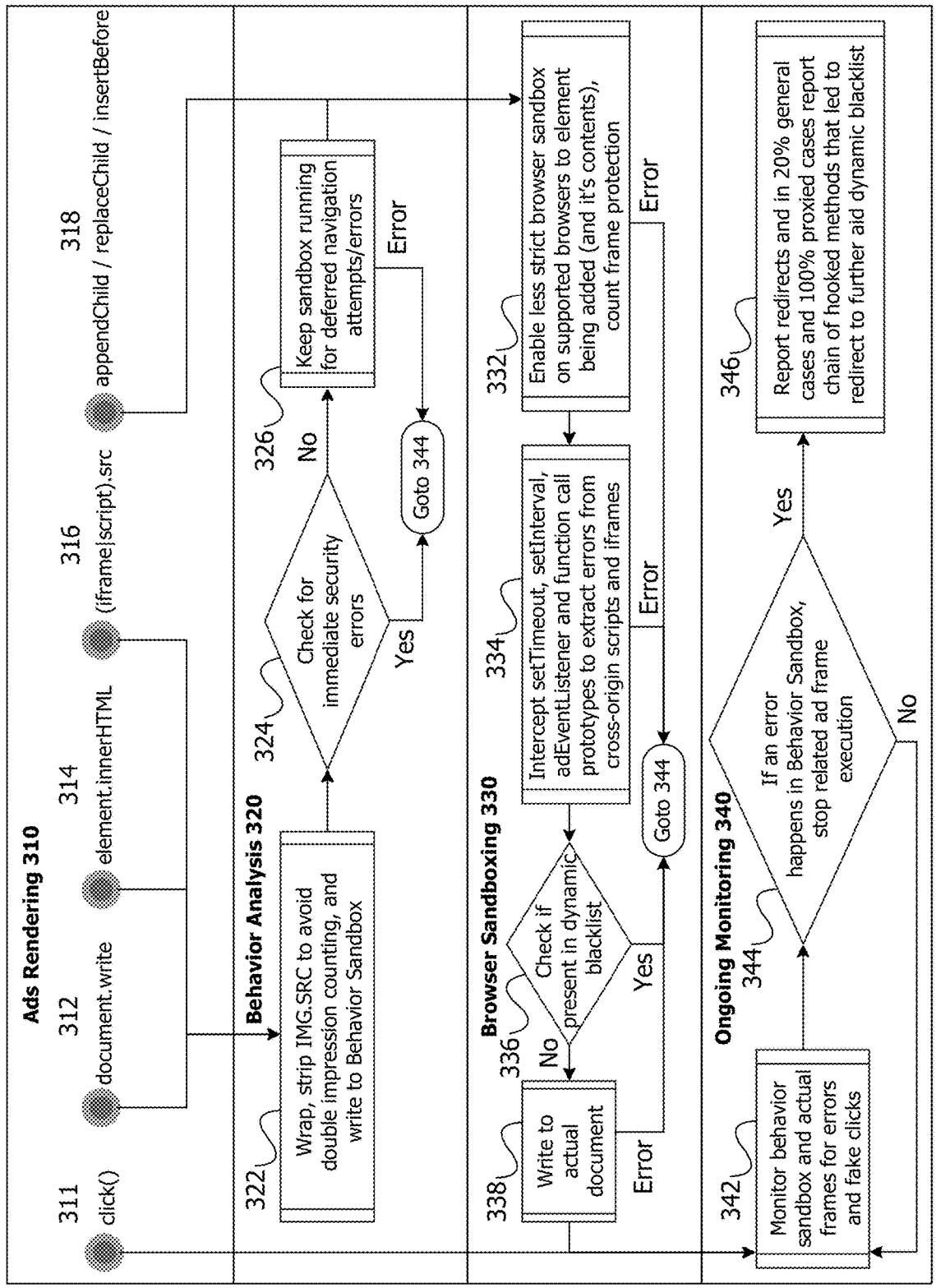
FIG. 3 is an operating environment/process for detecting malicious code existing in internet advertisements by ongoing sandbox monitoring.

Detecting at 230 will be discussed further below with respect to FIGS. 3-4, such as, detecting by ongoing sandbox monitoring.

Next, at 235 the detecting is reported by sending to source 130 reporting information 189 that is based on the detecting at 230. Reporting information 189 may report or include malicious code 155, unwanted action 158, and/or the harmful content 159.

Now, optionally, at 240 the protection code source 130 or updater 135 updates the protection code 180 based on the reporting information 189 and sends the updated protection code 180 to network 138 for downloading by the device 110 or numerous other user devices like device 110. Updating at 240 may be optional. Updating at 240 may include source 130 pushing the updated code 180 to CDN 138 using network 160.

Using the device 110 is possible to detect malicious code 155, such as noted at 230. The detecting may include communicating between the system 100 components. For example, referring now to FIG. 3 is a process 300 for detecting malicious code 155 existing in internet advertisements by ongoing sandbox monitoring. The process 300 may be or describe an operating environment in which the system 100 can perform the detecting. The process 300 may be an example of executing at 230 (and optionally reporting at 235) performed by the device 110 or the browser 114 executing protection code 182 of FIG. 1B. The process 300 starts at 310 and can end at 346; but the process can also be cyclical and return to 310 or 320 after 346. For example, after 346 the process may return to 310 for each internet malicious creative 154 that is requested by a call from a protected publisher's webpage content 123 is about to be rendered by the browser 114 of any of various ones of the user device 110. In some cases, determining "if" a condition, occurrence or event happened in process 300 may be determining "when" that a condition, occurrence or event happened.

The process 300 has 4 different stages 310, 320, 330 and 340 that break down the way protected published content 123 gets loaded by browser 114 and how the malicious creative 154 that is received in response to the call 127, is monitored and how code 155 is detected by executing protection code 182 as the malicious creative 154 is being displayed on the webpage of content 123. As noted above, as content 123 loads, it calls, receives and executes protection code 180 as code 182 prior to making call 127 for malicious creative 154.

For example, prior to ads rendering stage 310, user 110 may type in or click to an address of published page content 123 to go into that page in the browser 114. Then the browser 114 requests that content 123 and renders it inside the browser 114. As the browser renders the content 123 it makes call 125 for code 180; receives and executes code 180 as code 182. As the browser renders the content 123 it will then make call 127 to request the malicious creative 154 from somewhere, like an ad server; and the ad server returns the malicious creative 154. The ads rendering stage 310 may begin when the browser 114 is about to render content of malicious creative 154 on the webpage of content 123. That is, the content of malicious creative 154 including code 155 has not yet been loaded onto the webpage when process 300 begins.

In cases where code 180 or 182 does not exist, when browser 114 loads or renders "malware" malicious code 155, that code or content may be malicious and in most cases 1) can get access to entire page content 123 and data on it; 2) has the ability to navigate the user without their permission to any web address and any scan page; and/or 3) has the ability to mine cryptocurrency in the background based upon the page of content 123.

Thus, in process 300, code 182 can monitor and protect against the undetected, un-intercepted and/or unmodified rendering of code 155 at the stages 310-340 of rendering malicious creative 154. Before malicious creative 154 is actually rendered on the page of content 123, code 182 can monitor for and intercept a number of ways in which the malicious creative 154 can be rendered upon the page of content 123 by the browser 114 to detect and intercept code 155.

The process 300 starts at ads rendering stage 310 which includes 4 example processes for receiving and rendering ads. It is considered that ads rendering at 310 may include various computer related ad functions and/or ad actions. For example, at ads rendering stage 310 the internet malicious creative 154 that was requested by a call 127 from a protected publisher's webpage content 123 has been received and is about to be rendered by the browser 114 of the user device 110. Ads rendering stage 310 includes code 182 (in browser 114) receiving and rendering malicious creative 154, which includes receiving and rendering code 155. The malicious creative 154 may be received from advertiser 150 or another third party advertiser that has won the negotiation to fulfil call 127.

The 4 example processes for receiving and rendering ads are click( ) 311, document.write 312, element.innerHTML 314, (iframe|script).src 316; or appendChild or replaceChild or insertBefore 318. It can be appreciated other processes for receiving and rendering ads are considered. In addition, there may be fewer or more than the 4 example processes mentioned here. Each of the processes 311-318 may be a method that browser 114 is exposed to Javascript which may be what malicious creative 154 and code 155 are written in and what protection code 180 is written in. Each of the processes 311-318 may be a method by which browser 114 is exposed to Javascript to detect, intercept, inject and/or append code into the pages of content 123 that are being shown by the browser 114 to the user 111. Code 180 and 182 each include an interceptor 170-179 for monitoring and intercepting each of these processes 311-318. It can be appreciated that other than Javascript, various other languages or types of code may be used for or to write processes 311-318, malicious creative 154, code 155 and/or code 180. In some cases, interceptors 170-179 represent a general "executing code interceptor" which may intercept processes 311-318 and other processes for exposing the browser 114 to Javascript, malicious creative 154 and/or code 155. That is, interceptors 170-179 are several examples, there could be others.

For example, code 180 may be stored on CDN 138 (where it is updated by source 130) and be retrieved by the browser 114 from the CDN using call 125 which is place on the protect publisher page content 123, in the header of the page. So, protected page content 123 may download code 180 from a CDN when it is loading and installs code 180 which the browser 114 executes as executing code 182. Code 182 may execute/run automatically upon receipt of code 180 and invisibly to the user at the top of the webpage of protected content 123. The installed code or executing code 182 is installing interceptors 170-179 before the ad rendering of malicious creative 154 begins.

One processes for receiving and rendering ads is click( ) 311. At 311, a first click interceptor 178 of code 182 (e.g., as noted at 342) will monitor and intercept execution of this click( ) method of malicious creative 154 to detect and intercept execution of code 155 of the malicious creative 154. After process 311, ongoing monitoring stage 340 begins at 342.

A second process for receiving and rendering ads is document.write 312, where content of the malicious creative 154 is received from an outside source such as an ad server and then is written into a webpage using this document.write method. Here, document.write interceptor 170 of executing protection code 182 will monitor for and intercept this process and collect the content of malicious creative 154 at 312 before it is written to the page, to detect and intercept execution of code 155 of the malicious creative 154. After process 312, behavior analysis stage 320 begins at 322.

A third process for receiving and rendering ads is element.innerHTML 314, where someone can create in malicious creative 154 and the malicious creative 154 can have an element like an HTML element such as a frame or something that is shown on the page of content 123; and insert or inject inner HTML to the element in the same was as if they had obtained the code of malicious creative 154 somewhere and injected it to the page. Here, element.innerHTML interceptor 172 of executing protection code 182 will monitor for and intercept this process and collect the content of malicious creative 154 at 314 before it is written to the page, to detect and intercept execution of code 155 of the malicious creative 154. After process 314, behavior analysis stage 320 begins at 322.

A fourth process for receiving and rendering ads is (iframe/script).src 316, where someone can create in malicious creative 154 and the malicious creative 154 can have an iframe that points to an external page which will have the content of malicious creative 154 with a script (e.g., .SRC). Here, (iframe/script).src interceptor 174 executing protection code 182 will monitor for and intercept this process and collect the content of malicious creative 154 at 316 before it is written to the page, to detect and intercept execution of code 155 of the malicious creative 154. After process 316, behavior analysis stage 320 begins at 322.

A fifth process for receiving and rendering ads is appendChild or replaceChild or insertBefore 318, where someone can create in malicious creative 154 and the malicious creative 154 can have elements and modify them and append one to another like modifying a tree of nested elements using appendChild/replaceChild/insertBefore. Here, appendChild, replaceChild and insertBefore interceptor 176 executing protection code 182 will monitor for and intercept this process and collect the content of malicious creative 154 at 318 before it is written to the page, to detect and intercept execution of code 155 of the malicious creative 154. After process 318, browser sandboxing stage 330 begins at 332.

Processes 311-318 may be considered native prototypes that are intercepted (e.g. detected by and overridden) by code 182 to ingest incoming ad creatives, such as of the malicious creative 154. It is known that there are other processes that are allowed to put things on the page of malicious creative 154 that code 182 also intercepts; but 312-318 are the most common processes.

The intercepting at stage 310 and detecting by process 300 reduces a problem for publishers such as publisher 120 (e.g., AOL™, Huffington Post™, ESPN™) who are having users getting taken to malicious sites or content due to malware advertiser 150 because the code 155 can prohibit the browser 114 from executing a click on the browser back button (<), can divert or stop the publisher from making revenue from content 123 and can cause user complaints. So, the publishers can put code 180 or a call 125 for code 180 at the top of every page or content 123 so that code 182 intercepts (e.g., highjacks) all processes 311-318 by being executed, intercepting and/or modifying the publishers page before any ad creative 154 can get on the page. So, the ad creative 154 is not calling what it thinks it is (e.g., code 155 is not calling an unwanted action or access to a malware directed server because the call will be intercepted or modified by code 182) but after the calls are intercepted, creative 154 is calling code 182 at stages 320-340.

For example, after processes 312-316, process 300 moves to behavior analysis stage 320 where code 182 running at the top of the webpage of protected content 123 begins a behavior analysis of these processes intercepted at stage 310. At stage 320, the content of malicious creative 154 that is being written to the browser by processes 312-316 is run through behavior analysis of code 182 at 322-326.

At the stage 320, code 182 performs behavior analysis which allows code 182 to detect code 155 without having to know or focus on only those sets of predefined strings or unwanted actions that a protection code knows of. For example, code 182 does not have to capture every new payload or write to the page to really know that it is going to be an unwanted action. Instead, code 182 uses stage 320 that is aimed at allowing code 182 to understand that a certain piece of code of malicious creative 154 that is about to be written to the webpage of content 123 is going to unwanted action somewhere such as by code 155. For example, stage 320 includes interceptors 172-176 executing and rendering processes 312-316 of malicious creative 154, which may include executing and rendering code 155 at 322-326.

First, at 322, the code 182 "wraps" the HTML it receives from the interceptors 172-174 at 312-316 in a wrapper. Here, code 182 wraps the code or content of malicious creative 154 that is about to be written to the page inside of a wrapper of code 182 that allows code 182 to retrieve errors from the wrapped content of the ad by doing a special error handling, such as at 324, 326 and 342.

For example, some methods of malicious code 155, like location.replace and window.open will not trigger an error inside of a sandbox (e.g., sandbox 184) such as at 324, 326 or 342; and therefore code 182 wraps written scripts of malicious creative 154 in a java script (JS) closure which overrides those scripts of the ad so that they do trigger an error. The wrapper is or creates a closure (that is or is part of creative 185) in which the window (e.g., window.open) and location (e.g., location.replace) object, otherwise undetectable or unmodifiable, will be hidden from the script's scope. Being hidden from the script's scope means the "Potential malicious code" script will not see (e.g., be able to identify or access) the "location" from the global scope. One example of the wrapper looks something like:
Global Scope
Window=readonly browser window object
Location=readonly current browser window location
[
   CLOSURE with own
   Window=H local proxy object
   Location=H local writable proxy object
   Potential malicious code here
]

Here, because the potential malicious code 155 is placed inside of this closure it would access a window object that is created by the protection code 182 and not the outside global window of browser 114. For example, when code 155 refers to Window while being placed inside of this wrapper it will refer to an object of code 182, which can be detected and/or modified. This wrapper may be used when code 182 cannot hook into or replace a Window object in the browser 114 because it is readonly.

Other than a JS closure, other appropriate closures may be used to wrap malicious creative 154. In addition, it is considered that what is being wrapped may be a language or type of code other than HTML, but which also causes the functions noted for HTML at 322, such as by being code 155, causing an impression count and/or causing an unwanted action.

Next, at 322, the code 182 strips image scripts or IMG-.SRC in the content it receives from the interceptors 172-174 at 312-316 to avoid double impression counting, such as to external URLs. Here, because this .SRC type of HTML content of malicious creative 154 will likely load some pixels for tracking the ad, code 182 also strips the SRCs (e.g., the pointers to external URLs) of the content of malicious creative 154 at images that are pixels. Stripping at 322 may be stripping of code 155 of malicious creative 154. Stripped creative 185 of FIG. 1B is the content receive from 312-316 after it is wrapped and stripped at 322. So, code 182 will not allow this content of malicious creative 154, now stripped creative 185 to render pixels, so that when it is running within a behavioral sandbox 184 at 324, 326 or 342, creative 185 it will not trigger a tracking hit like it is being rendered to the user. Thus, there will be no extra counting of use (e.g., reporting or tracking) of malicious creative 154 caused by stage 320. In some cases, the legitimate first counting of use of the ad happens when malicious creative 154 is executed or rendering in the browser sandbox 186. Counting of the ad can happen anywhere in stage 330. It can also happen at 332, 338 or 342. Here, code 182 avoids double counting on the page content 123 of malicious creative 154 due to double rendering the ad, once on the behavioral sandbox 184 and also on the usual page of content 123 (e.g., in browser sandbox 186).

Embodiments that use code 182 to strip image scripts or IMG.SRC in the content they receive from 312-316 reduce the problem of creating errors in the ad measurement systems for malicious creative 154 by allowing process 300 to return a single legitimate count for the ad. As a result, advertiser 150 may pay money for legitimate creative 144 (which was corrupted into malicious creative 154, such as by the source 130) because a single count is generated for malicious creative 154 or 144, when malicious creative 154 is downloaded and executed in process 300. Here, malicious creative 154 gets counted but does not trigger malware unwanted action of code 155 because code 182 detects, intercepts and/or modifies code 155 during process 300.

Next, at 322, the code 182 writes the wrapped and stripped content it receives from the interceptors 172-174 at 312-316 as stripped creative 185 to a behavior sandbox 184 (see FIG. 1B) for execution in that sandboxes protected environment of code 182 or browser 114; and where that execution will not be visible to user 111. Here, code 182 writes to and executes wrapped creative 185 in the behavioral sandbox 184 at 324, 326 and 342. Because of the wrapping, errors for methods noted above will occur and because of stripping a tracking trigger will not occur. Also, due to the sandbox 184, any execution of code 155 will not actually cause an unwanted action.

The behavior sandbox 184 may be a hidden frame or environment existing in code 182 or browser 114 that isolates this execution of creative 185 from the display 113. The sandbox 184 can prevent incoming data from affecting a "live" execution of creative 185. Sandbox 184 is basically a hidden frame (e.g., not displayed on display 113) placed inside of the same page view (e.g., of content 123) inside of the same browser window of browser 114 that acts as a proxy, so all code (e.g., that is or is part of creative 185) that is being written to the page (e.g., of content 123) gets written to the sandbox 184 first. This code will get executed first in the sandbox 184, and then if deemed safe, this code will go to (e.g., be executing in) the original page of content 123 (such as in sandbox 186 or browser 114). Executing this code in sandbox 184 and the original page does not happen outside of browser 114 or network, but rather happens inside of the same page of browser 114.

The sandbox 184 will then wrap the potential unwanted action code (wraps written scripts of malicious creative 154 in a java script (JS) closure which creates stripped creative 185 and overrides those scripts of the ad so that they do trigger an error) and listen to that code generate errors when a failed unwanted action attempt occurs and/or listen to that code access fake location objects inside of the wrapper to know if the creative 185 includes malicious code (e.g., if the unwanted action code is bad or not). Listening can be performed by using intercepting writes to certain objects and "proxying" them through executing code 182. Of the code 182 notices someone (e.g., an unwanted action or other action of malicious creative 154) modifying the location object, the code would block that modification from happening.

For example, behavior sandbox 184 can use browser sandbox features available in old and new browsers that disallow actions by activated code 145 and/or 155 like pop-ups, redirects, etc. and report on errors at 346 when creative 185 is executing inside of sandbox 184 such as at 324, 326 or 342.

After 322, at 324, the code 182 checks for immediate security errors caused by immediate type unwanted actions of code 155 during the execution of creative 185 in sandbox 184. Here, code 182 is executing the stripped creative 185 from the code of malicious creative 154 that was intercepted at 312-316 in the special error handling code of sandbox 184 to extract immediate types of errors from executing code of creative 185 and to analyze the behavior of the ad. The sandbox 184 is very restrictive and prohibits unwanted actions out of the sandbox 184; and data from being downloaded to or received by the sandbox 184. Sandbox 184 restricts "top navigation" and also overrides objects using wrappers so any navigation made by the script of stripped creative 185 is restricted. Thus, sandbox 184 can be the sandbox attributes utilized by an iframe. Behavior sandbox 184 can utilize absence of "allow-top-navigation" attribute which means that the code inside sandbox 184 cannot unwanted action (e.g., cannot successfully redirect to outside of code 182 or browser 114 and thus such an attempted redirect request will cause an error in the sandbox, code 182 and/or browser 114). Thus, executing creative 185 inside of that sandbox will force errors resulting from execution of the code 155, such as any of a set of known errors that may occur when an unwanted action attempt (e.g., activation of or request by code 155) fails. Checking for the errors can be performed by code 182, on the client side, inside of the page view of content 123 in browser 114, checking to see if any errors exist that are caused by a failed unwanted action attempt. Such an attempt will fail if it includes or uses one of the unwanted action methods that was restricted by the restrictive sandbox 184. These errors may be forced from any of various possible versions of code 155 that are being executed that would otherwise succeed if they were executed outside of the sandbox 184, such as if instead, they were executed in browser sandbox 186.

Because code 182 is forcing these errors in the sandbox 184 is able to extract the details from those errors and understand what is executing in the sandbox. Code 182 is not able to run ads correctly in the sandbox 184, thus causing immediate types of errors for immediate types of unwanted actions because the ads will not display. However, code 182 can run ads in the sandbox 184 before the ads show up on a webpage displayed by browser 114 at 338 or 342.

For example, the immediate types of errors detected by code 182 at 324 may be caused by and indicate that they were caused by immediate type unwanted actions such as pop-ups, redirects, etc. that occur within a few milliseconds when code 155 or creative 185 is executing inside of sandbox 184 such as at 324, 326 or 342.

At 324 code 182 is protecting against immediate type errors and if creative 185 attempted to unwanted action, code 182 will detect one of these errors (e.g., caused by a failed unwanted action attempt) and know creative 185 has an immediate unwanted action from code 155. Upon detection of one of these errors at 324, process 300 will skip to 344 and code 182 will stop execution of creative 185. In this case, malicious creative 154 and code 155 will not actually render on the webpage of content 123, or visibly in browser 114. The error, skipping and/or stopping can also stop subsequent execution or unwanted actions of legitimate code 145 that was also included in creative 185. For example, even if a document.write of the wrapped creative 185 executing in the behavior sandbox 184 would be legitimate, the prior execution and error caused by execution of code 155 will cause the execution of the creative 185 to stop and the process to go to 344. Thus, the subsequent call of legitimate code 145 will fail to execute. In some cases, stopping execution of creative 185 may be intercepting malicious code 155 as noted for FIG. 1B.

The immediate type errors detected by code 182 at 324 include immediate security errors in sandbox 184 (instead of in the browser sandbox 186) caused when an immediate type unwanted action of code 155 can happen immediately or within a few milliseconds. However, some errors caused by unwanted actions from code 155 during execution of creative 185 in sandbox 184 can be deferred type unwanted actions that are delayed by seconds, such as by a 5, 10 or 15 second timeout. In this case, execution of creative 185 or code 155 will let the user 111 browse the page and after a while unwanted actions the user to other things according to code 155.

If there was no immediate unwanted action (e.g., detected by detecting errors) at 324, process 300 will continue forward to 326 and code 182 will keep the sandbox 184 running creative 185 to detect any deferred type unwanted actions or errors, such as from deferred navigation attempts by creative 185. These deferred attempts include the timeouts and/or attached things that detect user action and then cause an unwanted action of code 155.

For example, the deferred types of errors detected by code 182 at 326 may be caused by and indicate that they were caused by deferred unwanted actions such as unwanted actions of code 155 (e.g., noted for at 324) that happen after a timeout, upon completion of a network call, or in response to an event such as user input device (e.g., mouse wheel) rotation or movement that occur after a few seconds when code 155 or creative 185 is executing inside of sandbox 184 such as at 326 or 342.

Upon detection of any deferred errors at 326, process 300 will skip to 344 such as noted at 344.

For example, they include event handlers, that detect when user 111 moves a device (e.g., an input of device 117 such as a mouse), and when the user moves the device, code 155 detects the move, understands that the user has done that and causes an unwanted action then. It is noted that using event handlers helps code 155 avoid scanners. Detecting actual human user 111 moving a device includes detecting when the user is refreshing browser 114; refreshing or manipulating windows of device 110's desktop, and the like. It may also include code 155 verifying the move is of a real device that is moving in 3D space, and thus then do the unwanted action.

For some instance of code 182, the behavior analysis 320 and behavior sandbox 184 may not exist. In these cases, processes 322, 324, 326 and 344 do not occur. Instead, processes document.write 312, element.innerHTML 314, (iframe|script).src 316; and appendChild or replaceChild or insertBefore 318 are all received at process 332. Here, after processes 312-318, process 300 moves directly to browser sandboxing stage 330 where code 182 running at the top of the webpage of protected content 123 begins a sandboxing stage (e.g., which may include ongoing monitoring) of these processes intercepted at stage 310. Here, at stage 330, the content of malicious creative 154 that is being written to the browser by processes 312-318 is run through sandboxing stage of code 182 at 332-338.

After 326 or 318, process 300 moves to browser sandboxing stage 330 where code 182 running at the top of the webpage of protected content 123 begins browser sandboxing of process 318 intercepted at stage 310 or malicious creative 154 while creative 185 is running in the behavior sandbox 184 at 326. For example, for the process 318 the appendChild or replaceChild or insertBefore 318 is not run through stage 320 but is instead code 182 enable the less restrictive browser sandbox 186 and runs and renders the malicious creative 154 in that sandbox at 332. Stage 330 may describe ongoing sandbox monitoring. In some cases, enabling a less restrictive browser sandbox at 332, intercepting at 334 or ongoing monitoring at 342, and/or any one or more of processes 332-342 may be ongoing sandbox monitoring.

At 332, the code 182 writes the content it receives from the interceptor 176 at 318 as malicious creative 154 to a sandbox 186 (see FIG. 1B) for execution in that a less restrictive sandbox 186 (than sandbox 184) protected environment of code 182 or browser 114; and where that execution will be visible to user 111 but will have some restrictions for certain browser types of browser 114. Here, code 182 writes to and executes internet malicious creative 154 in the sandbox 186 at 332-344, such as for ongoing sandbox monitoring. Due to the sandbox 186, any execution of code 155 will actually cause an unwanted action if not restricted by sandbox 186 at 332, or as noted at 334-344.

In cases when the behavior analysis 320 and behavior sandbox 184 do not exist as noted above, at 332, if the malicious creative 154 or the malicious code 155 is an SRC type document, it may be wrapped in a java script (JS) closure to detect an unwanted action requested by the malicious code. In this case, the code 182 "wraps" the HTML it receives from the interceptors 172-174 at 312-316 in a wrapper. Consequently, in some cases, behavior sandbox 184 is executing a wrapped creative 156 which may be a Java script (JS) wrapped version of malicious creative 154 with code 155 in browser 114. In some cases, if the internet ad is an SRC type document, the malicious code is wrapped in a java script (JS) closure to detect an unwanted action requested by the malicious code. This may be code 182 detecting receipt by the browser 114 of, and due to that detecting, wrapping in a JS closure, a Javascript SRC (e.g., iframe.src) or a Javascript SRC document (e.g., iframe.src doc) sent to a frame of the browse. Code 182 may detect and wrap code sent to a Javascript protocol, such as a frame SRC sent to a Javascript protocol. Code 182 may detect receipt of but not wrapped document writes or inter HGMLs received by the browser. Other than a JS wrapped version, other appropriately wrapped versions of malicious creative 154 are also considered. The wrapped version executed by sandbox 186 may be an (iframe/script).src (e.g., see at 316), an iframe.src and/or an iframe.src doc if creative 154 or code 155 includes a JS protocol.

In some cases, the ads (e.g., malicious creative 154 with code 155 in browser 114) may contain JavaScript code in various forms, specifically:
  inline scripts (where the actual JavaScript (JS) code is
    shown directly in the ad originating from the server,
    inside of a script tag),
  inline event handlers, where the actual JS code is written
    inline in the event handlers, as defined in HTML code,
  "srcdoc"-initialized iframes: written with "srcdoc" contents, containing full document contents;

downloaded cross-origin scripts (with SRC property set to an HTTP(s) URL)

downloaded cross-origin frames (with SRC property set to an HTTP(s) URL)

Depending on the form of the JS inside of the ad, code 182 can apply different methods to wrap and/or protect it. Here, the code 182 detects the form of the JS inside the ad and "wraps" it so that behavior sandbox 184 is executing a wrapped creative 156. For example, code 182 can detect and wrap and/or protect as follows:

inline scripts (are same origin) and code 182 cane wrap them by shadowing global window and other global objects (e.g., such as shown and described at 322 for the "GLOBAL SCOPE" wrapper)

inline event handlers can be hooked into by code 182, and also wrapped by code 182 in the same way as inline scripts, once the inline event handlers are hooked into "srcdoc" initialized iframes contain full HTML document, so code 182 can apply wrapping logic to each individual element inside of the "srcdoc", recursively scripts downloaded via SRC (cross-origin) may not be accessible for code 182 to shadow it in this way; so when these are detected, code 182 may hook "setTimeout", "addEventListener" and other global functions that involve using callbacks (such as a callback after a certain timeout or event occurs), and make sure that any code inside these functions is:

a) wrapped in the same way where code 182 shadows the immediate access to window and other dangerous objects b) executed inside of a frame with necessary sandbox attributes set c) that any errors caught within the event handlers (like those occurring if a redirect was attempted but "allow-top-navigation-by-user-activation" sandbox attribute prevented it, the error will be caught, parsed to confirm it was a redirect attempt, and reported to protection code source 130 and/or updater 135 (e.g., code 182 creator's servers); this item (c) helps code 182, source 130 and/or updater 135 obtain full text of error messages that happen within cross-origin scripts (not iframes), which are otherwise inaccessible at the iframe window.onerror handler and will only show a "Script error" instead of the full error message. For example, a "Script error" may be what browsers 114 sends to the onerror callback when an error originates from a JavaScript file served from a different origin (different domain, port, or protocol). Detecting this error may be painful because even though there's an error occurring, code 182 may not know what the error is, nor from which code (e.g., of code 155) it's originating. And that's one purpose of window.onerror part of code 182—getting insight into uncaught errors in creating 154.

For example, some newer types of browser 114 have attributes in the browser to enable the browser sandbox 186, such as for ongoing sandbox monitoring. Code 182 will determine if the browser 114 is one of these newer types and if so, implement browser sandbox 186 at 332. In some cases, code 182 will simply try to run browser 186 and determine if it succeeded. One such attribute only allows navigation or action during execution or rendering of malicious creative 154 if user 111 clicks on the displayed ad. For example, code 182 can activate an attribute in browser 114 that assigns an I-frame in sandbox 186 that will only allow clicks to navigate or redirect the browser if they are real clicks by somebody really touching the screen, moving a device (e.g., movement or clicking of a mouse, or keyboard key) or something that is not machine or programmatically generated by code 155. Due to the sandbox 186, the browser 114 would let code 182 know if a redirect occurred based on somebody touching the screen or clicking the ad; or if it was a dynamic pro-grammatically generated. The browser sandbox 186 can be the sandbox attributes utilized by an iframe. However, if the above attribute is applied by sandbox 186 to real ads, when a user clicks on that ad, the navigation will be disallowed regardless. For example, user 111 will not be able to click on a legitimate creative 144 or legitimate code 145 and get a legitimate redirect if the sandbox 186 utilizes absence of "allow-top-navigation" attribute because the code inside sandbox 186 would not redirect (e.g., cannot successfully redirect to outside of code 182 or browser 114 and thus such an attempted redirect request will cause an error in the sandbox, code 182 and/or browser 114).

So, sandbox 186 does not apply the above attribute to real ads, and thus a user is able to click them, and the navigation will be allowed. The browser sandbox 186 applies the "allow-top-navigation-by-user-activation," which is a safety mechanism applied to the ads, such as to actual legitimate creatives 144. When this attribute is added, the redirects generated by or in browser 186 that are NOT in a response to a user action are supposed to be blocked by the browser 186, such as for ongoing sandbox monitoring. In some cases, both attributes (that of browser 184 and 186) are inherently flawed because they only stop some of the redirect methods and not all. The wrapper of creative 185 attempts to solve this as noted.

For example, the deferred types of errors detected by code 182 at 332 may be caused by and indicate that they were caused by deferred unwanted actions such as unwanted actions of code 155 (e.g., noted for at 332) that happen when iframes and elements containing iframes that are being added, appended, written, set via innerHTML or otherwise occur when code 155 or malicious creative 154 is executing inside of sandbox 186 such as at 332-342. Here, code 182 will use sandbox 186 to protected against these deferred unwanted actions, such as for ongoing sandbox monitoring, by using attributes on supported browsers, such as only allowing deferred redirects in response to actual user gesture detection (e.g., rotation or movement) at a user input device (e.g., mouse wheel, keyboard or touchpad).

If code 182 determines that the browser 114 is not one of these newer types, it may not implement browser sandbox 186 at 332.

Upon detection of one of these errors at 332, process 300 will skip to 344 such as noted at 344.

After 332 at 334, code 182 running at the top of the webpage of protected content 123 begins to intercept cross-origin malicious code 162 such as setTimeout, setInterval, adEventListener and function call prototypes to extract errors from cross-origin scripts and iframes (which are types of content 162) of malicious creative 154 running in the sandbox 186 at 332, such as for ongoing sandbox monitoring to detect cross-origin redirect content 162 or malicious code. The cross-origin malicious code 162 is a type of code 155. This intercepting may be performed by interceptor 179. This intercepting may occur in the browser sandbox 186, because this is for deferred unwanted actions.

Intercepting at 334 allows code 182 to intercept function calls related to the malicious creative 154 and the ad content potentially loading some external resources from some external, cross-origined domains, like other I-frames from other domains which will be cross-origined to browser 114 or code 182 by code 155, such as for ongoing sandbox monitoring. In some cases, the browsers 114 will by default restrict code 182's access to these other frames; and therefore code 182 will not be able by default to extract the errors from these cross-origin context or function call content 162 of code 155.

So, at 334 code 182 will want to detect if browser 114 or if malicious creative 154 contains a cross-origin redirect content 162 (e.g., a cross-origin i-frame inside of it, or a cross-origin script content) that's loaded from a CDN by code 155 (other than from CDN 138) for detecting cross-origin malicious code, such as from a malware or a bad actor host CDN. In some cases, when this cross-origin script attempts unwanted action, because it comes from another origin and is not just written to the page in sandbox 186 like other ads; and because it comes from another origin when it attempts to unwanted action, code 182 will not get a security error in the behavior sandbox 164 and will not know if it actually has attempted unwanted action even though the sandbox will block it from unwanted action and stop it from happening in the sandbox because it is very restrictive. Thus, code 182 will not know that the unwanted action was attempted because the browser limits what code 182 can know in these cross-origin contexts. This may be done by browsers to protect users' privacy; such as so webpage content cannot call to a large source of data such as a user's Gmail in the browser and take all of the user's Gmail data and copy it to a website that is not related to Gmail.

To bypass code 182 not knowing that the unwanted action was attempted and still retrieve errors for cross-origin context or content 162, interceptor 179 of code 182 will monitor for and intercept any function that will call a callback, such as settimeout, setinterval, adeventlistener functions which basically are ways to run a cross-origin unwanted action, such as by code 155. In some cases, these functions are not deferred ways to run an unwanted action, but instead are normal functions to run any code (wanted or unwanted) in callbacks. Code 182 will intercept these functions in a way that allows it to catch the errors and re-throw them if they are not failed unwanted action errors. This may be necessary because the calling code will often expect errors and have its own error-handling logic, so code 182 will want to make sure that this logic is preserved by not "eating" the error. Thus, code 182 is able to intercept certain functions of the cross-origin script that have an error in those functions. For example, when code 182 creates a sandbox frame at 334, code 182 subscribes to that frame and becomes a subscriber or listener to hear the error event that result from rethrowing the errors that the browser protected or stopped. Rethrowing the error allows the subscriber of the error event, code 182, to see or detect that error event while the cross-origin script executes, though the error event would not be detectable by a subscriber without rethrowing the error. If the errors are not re-thrown, they can be reported to a black list of code 182. Errors that are re-thrown can also be reported by code 182, if they are considered to be caused by malicious code 155 based on the error code or parsing. Thus, code 182 will be able to still obtain the error even through it is protected by the browser 114; and will be able to update its blacklist to handle errors and malicious code 155 with types of cross-origin unwanted actions or content 162.

In some cases, code 182 will intercept the deferred ways in a way that allows it to catch the errors and if they are not re-throw, report them to source 130 as reporting information 189. Code 182 can also report errors that are re-thrown, if they are considered to be caused by malicious code 155 based on the error code or parsing. In some cases, after rethrowing occurs, the "onerror" handler will still obtain cryptic "script error" and not full errors if they are caused by a cross-origin script, but code 182 will be able to log the message before rethrowing. Thus, source 130 will be able to still obtain the error even through it is protected by the browser 114; and will be able to update code 180 using updater 135 to handle errors and malicious code 155 with types of cross-origin unwanted actions or content 162. The updater 135 may not update the code 180 momentarily but may be an administrator or person that does update the code 180 and replaced the code 180 on the CDN 138 with that updated code.

For example, the deferred types of errors detected by code 182 at 332 may be caused by and indicate that they were caused by deferred unwanted actions such as unwanted actions of code 155 (e.g., noted for at 334) that happen in two cross-origin cases when code 155 or malicious creative 154 is executing inside of sandbox 186 such as at 342. In the first case, when scripts loaded in the current frame from cross-origin sources will not provide meaningful error messages to a parent iframe, code 182 bypasses this by intercepting the methods (e.g., setTimeout, setInterval, adEventListener and function call prototypes as content 162) to extract errors from cross-origin scripts; and performs error re-throws where appropriate. For example, code 182 would catch the deferred error, see if that error is originating from an unwanted action (e.g., is caused by a failed deferred unwanted action) or anything else. If it is something else (e.g., the intended behavior but not an unwanted action), code 182 would re-throw the error into browser 114 outside of code 182 so that the error is caught by the outside code logic which code 182 does not control, as if code 182 did not exist (e.g., was never on the page of content 123). This re-throw may be done so that code 182 does not affect legitimate creative 144 or third party code that does not do unwanted actions but has some other errors or error handling. In a second case, code 182 may proxy cross-origin iframes and scripts through source 130 or a server in a small percentage of sandbox 186 cases as content 162 to put into cross-frames, get errors from there and then build a dynamic iframe/script.src blacklist 164.

Upon detection of one of these errors at 334, process 300 will skip to 344 such as noted at 344.

Notably, after 334, at 336, code 182 running at the top of the webpage of protected content 123 builds a dynamic blacklist 164 using the cross-origin unwanted actions of 334, such as for ongoing sandbox monitoring. The blacklist 164 can be part of code 180 received by browser 114 and executed as code 182. The blacklist 164 has a limited number of entries from 334 by adding the cross-origin script or cross-origin iframe malicious code (e.g., the script) part of code 155 executed in sandbox 184 as an entry. Building the blacklist 164 at 336 may include code 182 intercepting subsequently detected cross-origin error events (e.g., at 336 and/or at 342) by comparing a subsequently detected cross-origin script or cross-origin iframe malicious code 155 with the dynamic blacklist 164. In some cases, code 182 can build a blacklist based on the cross-origin error events (e.g., at 336 and/or at 342), and also "call stack" information of these events. The blacklist 164 may be created on and be stored on source 130 so that updater 135 can update code 180 and send CDN that updated code 180. It may be something that is maintained on a server at CDN 138 and send with each download of the protection code 180 from the CDN to each of browser 114 executing on of content 123. Code 182 can also remove an entry from the blacklist 164 at 336, if for a certain amount of time in the future, cross-origin script or cross-origin iframe malicious code of that entry has not been executed on the webpage, such as by code 155 executing in the sandbox 184. The limited number of entries can be between 50 and 200 entries. They can be between 100 and 500 entries. The certain amount of time can be between 5 and 20 minutes. It can be between 10 and 60 minutes.

Embodiments using a blacklist 164 at 336 reduce problems encountered by embodiments that run on webpage and check an ad being run on the page against a signature list of entries having certain signatures; then stops any ad having a listed signature from rendering. A first problem for these embodiments is that they have to catch these ads manually before they can extract the entries for the signature list (e.g., before they can be written to the webpage and operate). A second problem is that bad actors such as advertiser 150 can modify their domain names and re-obfuscate their scripts each 15-30 minutes. So, these signature lists become obsolete in as quickly as 15 minutes. Also, when these embodiments are running, they are slowing down the loading of the page or ad with no added benefit because it takes time to go through each of the signature list entries and these lists are only growing with time. In many cases, these embodiments are not a reasonable solution long term.

On the other hand, in some cases, at 336, code 182 can create, maintain and use a dynamic blacklist 164 that is very small; so the blacklist only maintains active threats going on in the near future for browser 114; and the blacklist is able to be built on its own and automatically by being able to be populated by code 182 without manual or other entry, such as from source 130. In some cases, code 182 is able to do this because some types of browsers are more friendly to code 182 than others (e.g., will execute more functions of or have features programmable by code 182 than others); and will expose to code 182 more errors from cross-origin scripts than other browsers. This allows code 182 to build the blacklist 164 and report information 189 for the cross-origin type unwanted actions. The content 162 may be part of code 155.

In one example, while code 182 is doing this behavior analysis, let us say when browser 114 is Google®'s Chrome™ browser, then browser 114 will be able to report and code 182 will be able to capture content 162 and information about the content 162, such as the cross-origin script that the external URL attempted to unwanted action from and that the error type or code for the cross-origin unwanted action. If browser 114 is Safari™, it may not be able capture information about the content 162. So, for Safari™, browser 114 will only be able to report and code 182 will only capture the script or content 162 and that content 162 cause a "generic" security error in the sandbox. Here, code 182 will not know the specifics or type of security error; and will not block each of such security errors because if it did, it may block a lot of benign behavior that is not of a malicious code 155.

In this case, upon receiving the error from Chrome™, code 182 can recognize that the content 162 and information is from a supported browser (e.g. this content is okay because it is from Chrome™) and that this script content 162 from this URL triggered an unwanted action attempt, so code 182 adds the script content 162 to the dynamic blacklist 164. Then, when this script content 162 is run it in Safari™ (e.g., by a different user or on a different one of device 110 downloading code 180) and code 182 compares this script that is being appended to the page, code 182 can compare what is being run in Safari™ with blacklist 164 and will know it is triggering an unwanted action in Safari™. Then, code 182 can block the cross-origin script content 162 in Safari™ from adding to the page content 123.

Embodiments using a blacklist 164 at 336 reduce problems encountered when after a while, say 15 minutes, advertiser 150 or malware people have removed the script (e.g., content 162) and/or change the URL domains, etc. In this case, code 182 will determine that after a certain amount of time, this script has not been executed on the page content 123 and will remove that script from the blacklist 164 so that the blacklist 164 is not made overly long and/or contains obsolete data. Removing like this helps maintain a blacklist 164 of active threats/unwanted actions; that can be built automatically; that adds and removes active threats; and that is kept short, which improves speed of performance at 336, writing at 338 and of performance of process 300.

Upon detection of one of these errors at 336, process 300 will skip to 344 such as noted at 344.

After 336, at 338, code 182 running at the top of the webpage of protected content 123 will write or render the actual document that is the malicious creative 154 such as images, video and/or audio to the sandbox 186 and display 113 (and device 117 as needed), such as for ongoing sandbox monitoring. During and after this writing, code 182 will continue to monitor the sandbox 184 and 186 for unwanted actions by code 155 as noted, such as at 326, 332, 334, 336 and 342, such as for ongoing sandbox monitoring. Writing at 338 may include code 182 writing the content to the actual document of malicious creative 154 to browser sandbox 186, and monitor behavior of the sandbox 186 for deferred execution of an unwanted action.

Upon detection of any deferred errors at 338, process 300 will skip to 344 such as noted at 344.

Next, after process 311 and/or writing at 338, process 300 moves to ongoing monitoring stage 340 where code 182 running at the top of the webpage of protected content 123 begins ongoing monitoring of process 311 and/or writing at 338 intercepted at stage 310. The ongoing monitoring stage 340 may be part of ongoing sandbox monitoring, such as in addition to ongoing monitoring sandbox monitoring at 332-338.

For example, at 342, code 182 running at the top of the webpage of protected content 123 will continue monitoring the execution of creative 185 in behavior sandbox 184 as noted at 326-334 and the actual frames of malicious creative 154 rendered in browser sandbox 186 as noted at 332-338 for 1) unwanted actions by code 155; 2) errors resulting from unwanted actions by or caused by code 155; and/or 3) fake clicks (e.g., see the process of clicks ( ) at 311). Monitoring at 342 may include code 182 monitoring the behavior of malicious creative 154 inside a real frame that is written to the browser page of browser sandbox 186 for errors at noted at 332-338 and for fake clicks using click interceptor 178. Click interceptor 178 may be the first interceptor as noted at 311 and may be a native interceptor that is not specifically related to rendering, such as in the sandboxes.

Click interceptor 178 may intercept every call to a click function made within browser 114 and determine whether each click was generated programmatically depending on whether a click function is a read only event in the browser. For example, if code 182 detects that a click was not a read only event (e.g., was a write event or includes a write event) it will identify that click as generated programmatically and will generate a click type of security error indicating detection of a programmatically generated click. If code 182 detects that a click was a read only event (e.g., was not a write event, excludes a write event or is only a read event) it will identify that click as not generated programmatically and will not generate a click type of security error. In this case it will identify the click as a user generated click by somebody really clicking it in the browser. For most browsers, programmatic generated clicks cannot be modified to forge a read click (e.g., to be read only).

For example, the click types of errors detected by code 182 at 342 may be caused by and indicate that they were caused by click type unwanted actions such as unwanted actions of code 155 (e.g., noted for at 342) that happen using a number of read-only (so tamper-proof) properties of the click event that code 182 uses to can determine if a click event in browser 114 was generated programmatically or was based on an actual gesture (e.g., mouse click) by user 111. Here, code 182 will protected against these programmatically generated click unwanted actions by not processing or blocking any calls resulting from the click. The code 182 will only process and send calls for clicks that occur in response to actual user gesture detection at a user input device (e.g., mouse wheel, keyboard or touchpad).

At 326-342 code 182 is protecting against deferred types of errors and if creative 185 or 154 attempted to unwanted action, code 182 will detect one of these errors and know that creative 185 or 154 has a deferred unwanted action from code 155. Upon detection of one of these errors at 326-342, process 300 will skip to 344 and code 182 will stop execution of ad 185 and ad 154 in sandboxes 184 and 186; and will intercept any action 158 for downloading harmful content 159 in response to the deferred type of unwanted action of code 155. In this case, whatever of malicious creative 154 has already rendered will visibly render; but code 155 will not actually render on the webpage of content 123, or visibly in browser 114.

After 342, at 344, code 182 running at the top of the webpage of protected content 123 will determine if an error has happened in the behavior sandbox 184 and stop related malicious creative 154 frame execution in sandbox 186, such as at 338 and 342. Determining if an error happened at 344 may be or include detecting an error as noted at any of 324-342. This may include code 182 discontinuing or blocking any further or future rendering the actual document that is the malicious creative 154 such as images, video and/or audio to the sandbox 186 and display 113 (and device 117 as needed). Stopping at 344 may include code 182 stopping creative 185 execution in sandbox 184. In some cases, stopping at 344 includes code 182 stopping all future execution of creative 185 in sandbox 184 and creative 185 in sandbox 184 due to detecting or intercepting code 155 as noted at any of 324-342. In other cases, at 344, code 182 will block any future rendering of malicious creative 154 or calls of/from code 155 for a blockage amount of time, then let malicious creative 154 continue to render in the sandboxes after that time. In some cases, the blockage amount of time is between 2 and 50 milliseconds. In some cases, the blockage amount of time is based on the type of unwanted action or error detected for code 155. It can be based on both, as well.

For example, at 344, code 182 may stop ad frame execution as noted below for deferred types of errors detected by code 182 at 326-342 caused by and that indicate that they were caused by deferred type unwanted actions such as unwanted actions of code 155 that happen after immediate type errors detected at 324. Such deferred type unwanted actions of code 155 include deferred triggering of location-.replace, window.open etc. at 326-342. Upon such detection, code 182 can use window.stop to stop loading, and use global switch to stop executing of setTimeouts, event handlers, and domain name (DOM) updates in the iframe (e.g., of sandbox 186).

For example, if code 182 detects an error in behavior sandbox 184 during process 300, it will stop related ad frame execution of malicious creative 154 in browser sandbox 186 to the best of code 182's ability. In the case where a deferred type unwanted action is attempted 10 seconds after receiving at 154 at browser 114 (see at stage 310), code 182 will notice this attempt in the behavior sandbox 184 as noted at 326-342 and will know then that the same attempt will happen in the real frame of browser sandbox 186 a few milliseconds (e.g., between 2 and 10 milliseconds) later because sandbox 184 executes ad 182 that much earlier than sandbox 186 renders malicious creative 154. In other words, the same code 155 will be rendered on the actual page of sandbox 186 a few milliseconds after it is executed and causes and error in sandbox 184. So, code 182 has a few milliseconds to stop the rendering of malicious creative 154 or calls from code 155 from happening in the sandbox 186 where it is unprotected and will cause an actual unwanted action of code 155. In one case, at 344, code 182 will block all future rendering of malicious creative 154 and calls of code 155 in the sandbox 186. In a second case, at 344, code 182 will block all future rendering of malicious creative 154 and calls of code 155 in the sandbox 186 for a blockage amount of time, but will not block the future rendering of the malicious creative 154 after that time.

In these cases, the user 111 may not see or witness anything changing in browser 114 or on display 113. The user 111 will see a benign or legitimate part of malicious creative 154 (even though it is from advertiser 150 and has code 155) but will not see any content of or resulting from malicious code 155, such as not seeing any of harmful content 159.

For example, if the cross-origin interceptor 179 of code 182 intercepts a deferred type setTimeout unwanted action of code 155 in sandbox 184 at 324 or 342; code 182 will block all calls to the handler of browser 114 (e.g., from code 155) for the specific frame of malicious creative 154 rendered in the sandbox 186 for a blockage amount of time that is or exceeds the time of the setTimeout unwanted action.

Embodiments using stopping at 344 reduce problems encountered when a browser renders malicious creative 154 only in the browser or sandbox 186 and not ahead of time in sandbox 184. Code 182 executing creative 185 in sandbox 184 allows code 182 to selectively detect the deferred unwanted actions caused by code 155 and intercept code 155 by stopping as noted at 344. Moreover, detecting unwanted actions of code 155 by code 182 at any of 324-342 allows code 182 to intercept code 155 by stopping as noted at 344. In some cases, the intercepting of code 155 is stopping execution of, rendering of, calls of and/or downloads of code 155.

If no errors are detected at 344, process 300 will return to 342 to continue monitoring such as noted at 342. Upon completion of execution or rendering of creative 185 and 154 at 342-344 process 300 will continue to reporting at 346.

After 344, at 346, code 182 running at the top of the webpage of protected content 123 will report reporting information 189 to source 130 based on the unwanted actions and/or errors of code 155 detected at 324-342. The information 189 may be used by updater 135 of the source 130 to update code 180 and/or blacklist 164 to function more accurately such as based on the most recently received information 189.

In some cases, reporting at 346 includes report unwanted actions of code 155; and in 20% of general cases and 100% of proxied cases, reporting the chains of hooked methods that led to unwanted action by code 155 in order to further aid or update dynamic blacklist 164.

In some cases, reporting at 346 includes for 20% of the unwanted action situations caused by code 155 (e.g., at 334-336) code 182 collecting and reporting in information 189, some additional information from the stages 320-340 for additional analysis and generation of blacklist 164 by source 130.

Figure 4:
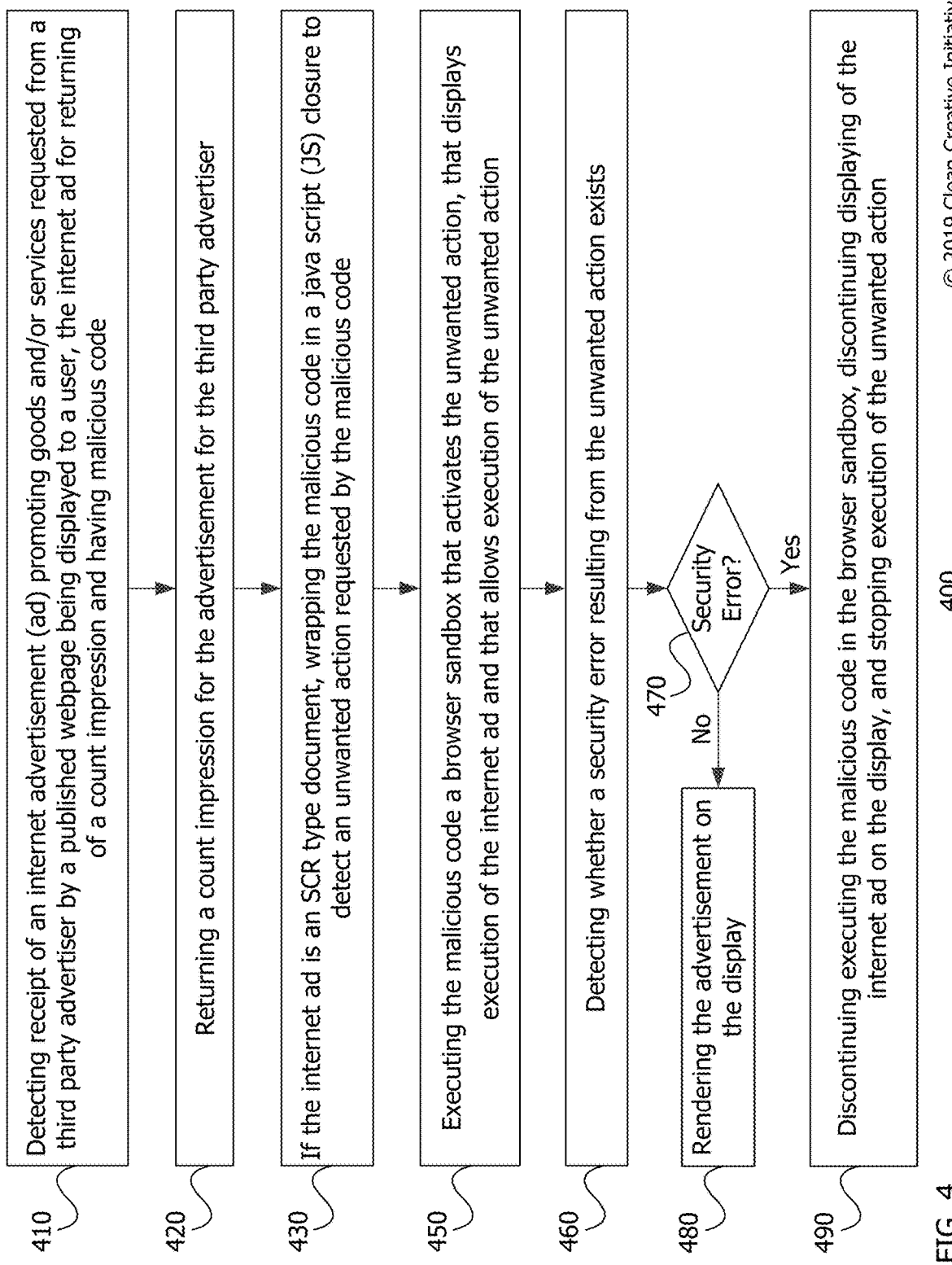
FIG. 4 is a flow diagram of a process for detecting malicious code existing in internet advertisements by ongoing sandbox monitoring.

For a second example of detecting malicious code, referring now to FIG. 4 is a process 400 for detecting of malicious code 155 existing in creatives or internet advertisements by ongoing sandbox monitoring. The process 400 may be or describe an operating environment in which the system 100 can perform the detecting. The process 400 may be performed by the device 110, code 180 and/or code 182. The process 400 starts at 410 and can end at 480 or 490; but the process can also be cyclical and return to 410 or 420 after 490. For example, after 480 or 490 the process may return to 410 when a publisher's webpage is requested by a user any of various user devices 110 connected to network 160; or may return to 420 when malicious code is detected by any of various user devices 110 connected to network 160. The process 400 may be an embodiment of executing at 230 and/or of process 300.

First, at 410 receipt of an internet ad such as malicious creative 154 is detected, such as an internet advertisement (ad) promoting goods and/or services requested from a third party advertiser 150 by a published webpage content 123 being displayed to a user 111. The malicious creative 154 has malicious code 155 and is also configured to return (e.g., for returning of) a count impression for the third party advertiser 150 when the malicious creative 154 is executed. The malicious code 155 is configured to cause a browser unwanted action when executed. Detecting at 410 may include descriptions for stage 310.

In some cases, returning a count impression is firing an impression pixel, firing an impression log and/or logging the impression. In some cases, creative 154 will fire impression pixels many times and to different sources. These impressions may not be directly connected to or performed by code 182. The ability of code 182 to stop malicious code 155 is not affected whether or not creative 154 will fire impression logs and/or pixels (most of the time it will).

Next, at 420 a first count impression for the malicious creative 154 is returned for the third party 150. The count may be reported to advertiser 150 or another source of ads connected to network 160 (e.g., to intermediary 161) which selected advertiser 150 having the malicious creative 154. In some cases, returning at 420 may occur after 430, 450 or 460. Returning a first count may occur during executing at 450; and may be performed by code of creative 154 or performed by browser 114 as instructed by code of creative 154. Returning at 420 may include descriptions at 332-342 for counting.

At 430, if the malicious creative 154 or the malicious code 155 is an SRC type document, it may be wrapped in a java script (JS) closure to detect an unwanted action requested by the malicious code. Wrapping at 430 may include descriptions at 322 and/or at 332 for wrapping. As noted at 332, in some cases the creative is not wrapped in JS closure. In some cases, 430 is optional and wrapping is not performed for an SRC type document.

Next, at 450 the malicious code 155 (wrapped or not) is executed in a browser sandbox 186 that activates an unwanted action of the malicious code 155, that displays the internet ad (e.g., displays executing creative 154) and that allows execution of the malicious code 155. Execution at 450 may prevent downloading harmful content 189 in response to the unwanted action. In some cases, at 450, malicious code 155 is executed in a browser sandbox 184 that activates a cross-origin unwanted action of the malicious code 155. Executing at 450 may include descriptions at 230, 324, 326 and/or 334-342 for executing. In some cases, it is executing the creative 154 and/or the malicious code 155 at 332-342 to perform ongoing sandbox monitoring.

When executing at 450, the browser sandbox 186 or code 182 may intercept the unwanted action 158 (e.g., prevents request for downloading harmful content 189 in response to the unwanted action). The unwanted action 158 is able to cause a browser unwanted action without user action and cause a security error when the unwanted action occurs within the browser sandbox. Executing at 450 may include descriptions at 230, 324, 326 and/or 334-342 for executing. For example, the unwanted action may be a deferred, a cross-origin and/or or a click unwanted action or redirect detected during ongoing sandbox monitoring.

Executing at 450 may include or be the descriptions at 334 for re-throwing an error. In some cases, re-throwing at 450, includes code 182 and/or browser 114 intercepting functions having an error and re-throwing the error so it is heard by a listener of code 182 and to maintain the error handling logic.

At 450 the malicious creative 154 or the malicious code 155 may be code that is not wrapped in a java script (JS) closure as described at 322 for wrapping and that is does not have hyper-text markup language (HTML) content striped from the malicious creative 154 or code 155 as described at 322 for stripping.

At 460 whether a security error resulting from the unwanted action of code 155 exists within the browser sandbox is detected. Detecting at 460 may be detecting when the security error occurs within the browser sandbox. For example, the error may be an immediate, a deferred, a cross-origin and/or or a click error detected based on the unwanted action at 450. Detecting at 460 may include descriptions at 230, 324, 326 and/or 334-344 for detecting, such to detect unwanted actions during ongoing sandbox monitoring. In some cases, it is detecting the cross-origin unwanted action at 334 and/or at 342.

At 470 it is determined whether or not the security error was detected at 460.

If or when the security error was not detected at 470, process 400 continues to 480 where the malicious creative 154 is rendered on the display 113. Here, for example, the malicious code 155 may not have been executed at 450 and so executing continues at 450 until the unwanted action occurs at 450-460. Rendering at 480 may include descriptions at 230 and/or 332-344.

If or when the security error is detected at 470, process 400 continues to 490 where executing the malicious code 155 in the browser sandbox 186 is discontinued, the internet ad or malicious code 155 is no longer displayed on the display 113, and the execution of the unwanted action is stopped. Stopping at 490 may include intercepting the malicious code 155 and/or the unwanted action 158. Intercepting the unwanted action may include stopping or discontinuing the unwanted action, such as stopping a request for redirect or for downloading harmful content 159. Actions performed at 490 may include descriptions at 230 and/or 334-344. In some cases, actions performed at 490 are descriptions at 344. In some cases, actions performed at 490 are descriptions at 332-344 such to intercept or stop unwanted actions during ongoing sandbox monitoring.

In some cases, actions performed at 490 include detecting and/or intercepting code 155 as noted herein. The detecting may include discontinuing executing the malicious code 155 in the browser 114, and discontinuing displaying the malicious creative 154 on the display 113 in response to the unwanted action. It may also include intercepting requests for unwanted action 158 in response to a deferred type of unwanted action.

In some cases, the webpage of content 123 has a display area where the cross-origin malicious code is requested, downloaded and/or executed while the creative 154 is displayed in browser 114 by the browser sandbox 184 while code 182 is executing.

In some case, during process 200, 300 and/or 400 code 182 and/or interceptors 170-179 are searching for, monitoring for, detecting, intercepting and/or modifying text strings of malicious creative 154, 185 and/or code 155. That is the code 182 and/or interceptors 170-179 are able to detect certain strings of text, software or computer code executing on device 110 to perform the functions described for FIGS. 1-4.

FIG. 5 is a block diagram of a computing device 500. The computing device 500 may be representative of any of the components of system 100, such as device 110. The computing device 500 may be a desktop or laptop computer, a server computer, a client computer, a network router, a network switch, a network node, a tablet, a smartphone or other mobile device. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. For example, device 110 or the components of system 100 may perform managing the detecting of malicious code existing in creatives or internet advertisements during ongoing sandbox monitoring, using the content 123, call 125, code 180 and/or code 182.

The computing device 500 has a processor 510 coupled to a memory 512, storage 514, a network interface 516 and an I/O interface 518. The processor 510 may be or include one or more microprocessors, field programmable gate arrays (FPGAs), application specific integrated circuits (ASICs), programmable logic devices (PLDs) and programmable logic arrays (PLAs).

The memory 512 may be or include RAM, ROM, DRAM, SRAM and MRAM, and may include firmware, such as static data or fixed instructions, BIOS, system functions, configuration data, and other routines used during the operation of the computing device 500 and processor 510. The memory 512 also provides a storage area for data and instructions associated with applications and data handled by the processor 510, such as the content 123, call 125, code 180 and/or code 182. As used herein the term "memory" corresponds to the memory 512 and explicitly excludes transitory media such as signals or waveforms.

The storage 514 provides non-volatile, bulk or long-term storage of data or instructions in the computing device 500, such as content 123, call 125, code 180 and/or code 182. The storage 514 may take the form of a magnetic or solid state disk, tape, CD, DVD, or other reasonably high capacity addressable or serial storage medium. Multiple storage devices may be provided or available to the computing device 500. Some of these storage devices may be external to the computing device 500, such as network storage or cloud-based storage. As used herein, the terms "storage" and "storage medium" correspond to the storage 514 and explicitly exclude transitory media such as signals or waveforms. In some cases, such as those involving solid state memory devices, the memory 512 and storage 514 may be a single device.

The network interface 516 includes an interface to a network such as a network that can be used to communicate network packets, network messages, telephone calls, faxes, signals, streams, arrays, content 123, call 125, code 180 and/or code 182 as described herein. The network interface 516 may be wired and/or wireless.

The I/O interface 518 interfaces the processor 510 to peripherals (not shown) such as displays, video and still cameras, microphones, user input devices (e.g., touchscreens, mice, keyboards and the like) and USB devices. In some cases, the I/O interface 518 includes the peripherals, such as displays (e.g., display 113) and user input devices, for being accessed by content 123, call 125, code 180 and/or code 182 to perform any of the actions noted in FIGS. 1-4.

In some cases, storage 514 is a non-volatile machine-readable storage medium that includes all types of computer readable media, including magnetic storage media, optical storage media, and solid state storage media. It should be understood that the software can be installed in and sold with the content 123, call 125, code 180, browser 114 and/or device 110 and/or the other published content or components of the system 100. Alternatively, the software can be obtained and loaded into the content 123, call 125, code 180, browser 114 and/or device 110 and/or the other components of the system 100, including obtaining the software via a disc medium or from any manner of network or distribution system, including from a server owned by the software creator or from a server not owned but used by the software creator. The software can be stored on a server such as the CDN 138 or source 130 for distribution over the Internet.

By providing detecting of malicious code existing in creatives or internet advertisements during ongoing sandbox monitoring, the content 123, call 125, code 180, code 182 and/or the other components of the system 100 increase computer efficiency because they provide a quicker, automated and more accurate detecting of malicious code existing in creatives or internet advertisements as noted herein.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The content 123, call 125, code 180, code 182 and/or the other components of the system 100 may include a detecting of malicious code existing in creatives or internet advertisements unit and/or a computing unit. These units may be hardware, software, firmware, or a combination thereof. Additional and fewer units, modules or other arrangement of software, hardware and data structures may be used to achieve the processes and apparatuses described herein.

CLOSING COMMENTS

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for detecting malicious code existing in third party internet advertisements by ongoing sandbox monitoring, the method comprising:
   executing a user requested protected published webpage having a call to a protection code source for protection code and a call to a third party for the internet advertisement for good and/or services and having malicious code existing in the ad;
   executing the call to the protection code source for and downloading the protection code;
   executing the protection code; then
   executing the call to the third party for and downloading the internet ad;
   detecting receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;
   executing the malicious code in a browser sandbox that activates the unwanted action, that displays the internet ad, and that stops execution of the unwanted action if a security error is detected;
   wherein the activated unwanted action causes the browser unwanted action without user action and causes the security error when the unwanted action occurs;
   returning a count impression for the internet ad for the third party advertiser during executing;
   detecting whether the security error resulting from the unwanted action exists; and
   when the security error exists, discontinuing executing the malicious code in the browser sandbox, discontinuing displaying of the internet ad on the display, and stopping execution of the unwanted action; then
   reporting to the protection code source, detecting information that is based on the detecting of the security error.

2. The method of claim 1, wherein the unwanted action is a deferred type of unwanted action and the security error is a deferred type of security error; and further comprising:
   if the internet ad is an SRC type document, wrapping the malicious code in a java script (JS) closure to detect an unwanted action requested by the malicious code.

3. The method of claim 1, wherein the webpage has a display area where the browser sandbox executes the malicious code and displays the internet ad; and
   wherein the browser sandbox is executed by a browser of a computing device.

4. A method for detecting malicious code existing in third party internet advertisements by ongoing sandbox monitoring, the method comprising:
   detecting receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;
   executing the malicious code in a browser sandbox that activates the unwanted action, that displays the internet ad, and that stops execution of the unwanted action if a security error is detected;
   wherein the activated unwanted action causes the browser unwanted action without user action and causes the security error when the unwanted action occurs;
   returning a count impression for the internet ad for the third party advertiser during executing;
   detecting whether the security error resulting from the unwanted action exists;
   when the security error exists, discontinuing executing the malicious code in the browser sandbox, discontinuing displaying of the internet ad on the display, and stopping execution of the unwanted action;
   detecting receipt of one of a JS closure, a Javascript SRC or a Javascript SRC document;
   creating a JS wrapped version of the detected JS closure, Javascript SRC or Javascript SRC document; and
   executing the JS wrapped version of the detected JS closure, Javascript SRC or Javascript SRC document in the browser sandbox.

5. The method of claim 1, further comprising:
re-throwing the detected security error so it is heard by the browser sandbox or browser.

6. A method for detecting malicious code existing in third party internet advertisements by ongoing sandbox monitoring, the method comprising:
detecting receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed, wherein the unwanted action is a deferred type of unwanted action and the security error is a deferred type of security error;
if the internet ad is an SRC type document, wrapping the malicious code in a java script (JS) closure to detect an unwanted action requested by the malicious code;
executing the malicious code in a browser sandbox that activates the unwanted action, that displays the internet ad, and that stops execution of the unwanted action if a security error is detected;
wherein the activated unwanted action causes the browser unwanted action without user action and causes the security error when the unwanted action occurs;
returning a count impression for the internet ad for the third party advertiser during executing;
detecting whether the security error resulting from the unwanted action exists;
when the security error exists, discontinuing executing the malicious code in the browser sandbox, discontinuing displaying of the internet ad on the display, and stopping execution of the unwanted action;
wherein the deferred type of unwanted action is a cross-origin script or a cross-origin iframe having malicious code including one of a settimeout function, a setinterval function or an adeventlistener function; and
stopping execution of the deferred type of error event includes capturing that a script on a uniform resource locator (URL) attempted to cause the browser to perform an unwanted action.

7. The method of claim 6, further comprising building a dynamic blacklist having a limited number of entries by:
adding the cross-origin script or cross-origin iframe malicious code as an entry;
intercepting a future cross-origin error event by comparing a future cross-origin script or cross-origin iframe malicious code with the dynamic blacklist; and
removing an entry when for a certain amount of time cross-origin script or cross-origin iframe malicious code of that entry has not been executed on the webpage.

8. The method of claim 1, wherein activating the malicious code requests, downloads and attempts to display harmful content downloaded in response to the activation of the malicious code; and
wherein the malicious code is malware and includes a call to download harmful content from a harmful content source.

9. A method for detecting malicious code existing in third party internet advertisements by ongoing sandbox monitoring, the method comprising:
detecting receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;
executing the malicious code in a browser sandbox that activates the unwanted action, that displays the internet ad, and that stops execution of the unwanted action if a security error is detected;
wherein the activated unwanted action causes the browser unwanted action without user action and causes the security error when the unwanted action occurs;
returning a count impression for the internet ad for the third party advertiser during executing;
detecting whether the security error resulting from the unwanted action exists;
when the security error exists, discontinuing executing the malicious code in the browser sandbox, discontinuing displaying of the internet ad on the display, and stopping execution of the unwanted action;
detecting receipt of a plurality of the malicious codes of internet advertisements (ads) requested from various third party advertisers by the webpage;
returning a first count impression for the internet ads to the various third party advertisers;
executing the between 1 and 10 percent of the malicious codes in the browser sandbox; and
detecting whether a security error resulting from the unwanted action exists for the between 1 and 10 percent of the malicious codes.

10. A non-volatile machine readable medium storing a program having instructions which when executed by a processor will cause the processor to detect malicious code existing in third party internet advertisements by ongoing sandbox monitoring, the instructions of the program for:
executing a user requested protected published webpage having a call to a protection code source for protection code and a call to a third party for the internet advertisement for good and/or services and having malicious code existing in the ad;
executing the call to the protection code source for and downloading the protection code;
executing the protection code; then
executing the call to the third party for and downloading the internet ad;
detecting receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;
executing the malicious code in a browser sandbox that activates the unwanted action, that displays the internet ad, and that stops execution of the unwanted action if a security error is detected;
wherein the activated unwanted action causes the browser unwanted action without user action and causes the security error when the unwanted action occurs;
returning a count impression for the internet ad for the third party advertiser during executing;
detecting whether the security error resulting from the unwanted action exists; and
when the security error exists, discontinuing executing the malicious code in the browser sandbox, discontinuing displaying of the internet ad on the display, and stopping execution of the unwanted action; then reporting to the protection code source, detecting information that is based on the detecting of the security error.

11. The medium of claim 10, wherein the unwanted action is a deferred type of unwanted action and the security error is a deferred type of security error; and further comprising:
if the internet ad is an SRC type document, wrapping the malicious code in a java script (JS) closure to detect an unwanted action requested by the malicious code.

12. The medium of claim 10, wherein the webpage has a display area where the browser sandbox executes the malicious code and displays the internet ad; and
wherein the browser sandbox is executed by a browser of a computing device.

13. A non-volatile machine readable medium storing a program having instructions which when executed by a processor will cause the processor to detect malicious code existing in third party internet advertisements by ongoing sandbox monitoring, the instructions of the program for:
detecting receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;
executing the malicious code in a browser sandbox that activates the unwanted action, that displays the internet ad, and that stops execution of the unwanted action if a security error is detected;
wherein the activated unwanted action causes the browser unwanted action without user action and causes the security error when the unwanted action occurs;
returning a count impression for the internet ad for the third party advertiser during executing;
detecting whether the security error resulting from the unwanted action exists;
when the security error exists, discontinuing executing the malicious code in the browser sandbox, discontinuing displaying of the internet ad on the display, and stopping execution of the unwanted action;
detecting receipt of one of a JS closure, a Javascript SRC or a Javascript SRC document;
creating a JS wrapped version of the detected JS closure, Javascript SRC or Javascript SRC document; and
executing the JS wrapped version of the detected JS closure, Javascript SRC or Javascript SRC document in the browser sandbox.

14. The method of claim 10, the instructions of the program further for:
re-throwing the detected security error so it is heard by the browser sandbox or browser.

15. A non-volatile machine readable medium storing a program having instructions which when executed by a processor will cause the processor to detect malicious code existing in third party internet advertisements by ongoing sandbox monitoring, the instructions of the program for:
detecting receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;
executing the malicious code in a browser sandbox that activates the unwanted action, that displays the internet ad, and that stops execution of the unwanted action if a security error is detected;
wherein the activated unwanted action causes the browser unwanted action without user action and causes the security error when the unwanted action occurs;
returning a count impression for the internet ad for the third party advertiser during executing;
detecting whether the security error resulting from the unwanted action exists;
when the security error exists, discontinuing executing the malicious code in the browser sandbox, discontinuing displaying of the internet ad on the display, and stopping execution of the unwanted action;
wherein the deferred type of unwanted action is a cross-origin script or a cross-origin iframe having malicious code including one of a settimeout function, a setinterval function or an adeventlistener function;
intercepting the deferred type of error event includes capturing that a script on a uniform resource locator (URL) attempted to unwanted action the browser;
further comprising building a dynamic blacklist having a limited number of entries by:
adding the cross-origin script or cross-origin iframe malicious code as an entry;
intercepting a future cross-origin error event by comparing a future cross-origin script or cross-origin iframe malicious code with the dynamic blacklist; and
removing an entry when for a certain amount of time cross-origin script or cross-origin iframe malicious code of that entry has not been executed on the webpage.

16. The medium of claim 10, further comprising:
a user input device
a display device
a processor
a memory
wherein the processor and the memory comprise circuits and software for performing the instructions on the storage medium.

17. A system for detecting malicious code existing in third party internet advertisements by ongoing sandbox monitoring, the system comprising:
a user device having a memory storing protection code instructions to:
execute a user requested protected published webpage having a call to a protection code source for protection code and a call to a third party for the internet advertisement for good and/or services and having malicious code existing in the ad;
execute the call to the protection code source for and downloading the protection code;
execute the protection code; then
execute the call to the third party for and downloading the internet ad;
detect receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;
execute the malicious code in a browser sandbox that activates the unwanted action, that displays the internet ad, and that stops execution of the unwanted action if a security error is detected;

wherein the activated unwanted action causes the browser unwanted action without user action and causes the security error when the unwanted action occurs;

detect whether the security error resulting from the unwanted action; and when the security error exists, discontinue executing the malicious code in the browser sandbox, discontinue displaying of the internet ad on the display, and stop execution of the unwanted action; then report to the protection code source, detecting information that is based on the detecting of the security error.

18. The system of claim 17, the system further comprising:

a user input device
a display device
a processor
wherein the processor and the memory comprise circuits and software for performing the detecting malicious code existing in third party internet advertisements.

19. A non-volatile machine readable medium storing a program having instructions which when executed by a processor will cause the processor to detect malicious code existing in third party internet advertisements by ongoing sandbox monitoring, the instructions of the program for:

detecting receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;

executing the malicious code in a browser sandbox that activates the unwanted action, that displays the internet ad, and that stops execution of the unwanted action if a security error is detected;

wherein the activated unwanted action causes the browser unwanted action without user action and causes the security error when the unwanted action occurs;

returning a count impression for the internet ad for the third party advertiser during executing;

detecting whether the security error resulting from the unwanted action exists;

when the security error exists, discontinuing executing the malicious code in the browser sandbox, discontinuing displaying of the internet ad on the display, and stopping execution of the unwanted action;

detecting receipt of a plurality of the malicious codes of internet advertisements (ads) requested from various third party advertisers by the webpage;

returning a first count impression for the internet ads to the various third party advertisers;

executing the between 1 and 10 percent of the malicious codes in the browser sandbox; and detecting whether a security error resulting from the unwanted action exists for the between 1 and 10 percent of the malicious codes.

20. A system for detecting malicious code existing in third party internet advertisements by ongoing sandbox monitoring, the system comprising:

a user device having a memory storing protection code instructions to:

detect receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;

execute the malicious code in a browser sandbox that activates the unwanted action, that displays the internet ad, and that stops execution of the unwanted action if a security error is detected;

wherein the activated unwanted action causes the browser unwanted action without user action and causes the security error when the unwanted action occurs;

detect whether the security error resulting from the unwanted action;

when the security error exists, discontinue executing the malicious code in the browser sandbox, discontinue displaying of the internet ad on the display, and stop execution of the unwanted action;

detect receipt of one of a JS closure, a Javascript SRC or a Javascript SRC document;

create a JS wrapped version of the detected JS closure, Javascript SRC or Javascript SRC document; and execute the JS wrapped version of the detected JS closure, Javascript SRC or Javascript SRC document in the browser sandbox.

21. A system for detecting malicious code existing in third party internet advertisements by ongoing sandbox monitoring, the system comprising:

a user device having a memory storing protection code instructions to:

detect receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed, wherein the unwanted action is a deferred type of unwanted action and the security error is a deferred type of security error;

if the internet ad is an SRC type document, wrapping the malicious code in a java script (JS) closure to detect an unwanted action requested by the malicious code;

execute the malicious code in a browser sandbox that activates the unwanted action, that displays the internet ad, and that stops execution of the unwanted action if a security error is detected;

wherein the activated unwanted action causes the browser unwanted action without user action and causes the security error when the unwanted action occurs;

detect whether the security error resulting from the unwanted action;

when the security error exists, discontinue executing the malicious code in the browser sandbox, discontinue displaying of the internet ad on the display, and stop execution of the unwanted action;

wherein the deferred type of unwanted action is a cross-origin script or a cross-origin iframe having malicious code including one of a settimeout function, a setinterval function or an adeventlistener function; and stopping execution of the deferred type of error event includes capturing that a script on a uniform resource locator (URL) attempted to cause the browser to perform an unwanted action.

22. A system for detecting malicious code existing in third party internet advertisements by ongoing sandbox monitoring, the system comprising:

a user device having a memory storing protection code instructions to:

detect receipt of an internet advertisement (ad) promoting goods and/or services requested from a third party advertiser by a published webpage being displayed to a user, the internet ad configured to return a count impression for the third party advertiser when the ad is executed, the internet ad including malicious code configured to cause a browser unwanted action when executed;

execute the malicious code in a browser sandbox that activates the unwanted action, that displays the internet ad, and that stops execution of the unwanted action if a security error is detected;

wherein the activated unwanted action causes the browser unwanted action without user action and causes the security error when the unwanted action occurs;

detect whether the security error resulting from the unwanted action;

when the security error exists, discontinue executing the malicious code in the browser sandbox, discontinue displaying of the internet ad on the display, and stop execution of the unwanted action;

detecting receipt of a plurality of the malicious codes of internet advertisements (ads) requested from various third party advertisers by the webpage;

returning a first count impression for the internet ads to the various third party advertisers;

executing the between 1 and 10 percent of the malicious codes in the browser sandbox; and detecting whether a security error resulting from the unwanted action exists for the between 1 and 10 percent of the malicious codes.

* * * * *